US008595314B1

(12) United States Patent
Hughes

(10) Patent No.: US 8,595,314 B1
(45) Date of Patent: Nov. 26, 2013

(54) DEFERRED DATA STORAGE

(75) Inventor: David Anthony Hughes, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 14 days.

(21) Appl. No.: 13/517,575

(22) Filed: Jun. 13, 2012

Related U.S. Application Data

(63) Continuation of application No. 12/151,839, filed on May 8, 2008, which is a continuation-in-part of application No. 11/998,726, filed on Nov. 30, 2007.

(51) Int. Cl.
*G06F 15/167* (2006.01)

(52) U.S. Cl.
USPC .......................................................... 709/212

(58) Field of Classification Search
USPC .......................................................... 709/212
See application file for complete search history.

(56) References Cited

U.S. PATENT DOCUMENTS

| | | | |
|---|---|---|---|
| 5,307,413 A | 4/1994 | Denzer | |
| 5,359,720 A | 10/1994 | Tamura et al. | |
| 5,483,556 A | 1/1996 | Pillan et al. | |
| 5,592,613 A | 1/1997 | Miyazawa et al. | |
| 5,611,049 A | 3/1997 | Pitts | |
| 5,675,587 A | 10/1997 | Okuyama et al. | |
| 5,754,774 A * | 5/1998 | Bittinger et al. | 709/203 |
| 5,802,106 A | 9/1998 | Packer | |
| 5,883,891 A | 3/1999 | Williams et al. | |
| 6,000,053 A | 12/1999 | Levine et al. | |
| 6,003,087 A * | 12/1999 | Housel et al. | 709/229 |
| 6,081,883 A | 6/2000 | Popelka et al. | |
| 6,295,541 B1 | 9/2001 | Bodnar et al. | |
| 6,308,148 B1 | 10/2001 | Bruins et al. | |
| 6,311,260 B1 | 10/2001 | Stone et al. | |
| 6,374,266 B1 | 4/2002 | Shnelvar | |
| 6,434,662 B1 | 8/2002 | Greene et al. | |
| 6,438,664 B1 | 8/2002 | McGrath et al. | |
| 6,452,915 B1 | 9/2002 | Jorgensen | |
| 6,587,985 B1 | 7/2003 | Fukushima et al. | |
| 6,618,397 B1 | 9/2003 | Huang | |

(Continued)

FOREIGN PATENT DOCUMENTS

EP    1507353 A2    2/2005

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14pages (Previously cited as: Zhao et al.; "Analysis and Improvement on IPSEC Anti-Replay Window Protocol"; 2003; IEEE' pp. 553-558).

(Continued)

*Primary Examiner* — Imad Hussain
(74) *Attorney, Agent, or Firm* — Carr & Ferrell LLP

(57) ABSTRACT

A method, system, and computer readable storage medium for deferred data storage are disclosed. Data sent via a local-area network is intercepted at a first hardware appliance of a plurality of hardware appliances in response to a first request for the data. A determination is performed of whether the data is locally accessible to the first hardware appliance. Instructions are transmitted to the first hardware appliance to retrieve the data locally accessible to the hardware appliance. The data is stored on at least one temporary page at a hardware appliance. The first hardware appliance and the second hardware appliance are in communication via the local-area network.

18 Claims, 14 Drawing Sheets

(56) References Cited

U.S. PATENT DOCUMENTS

| | | | |
|---|---|---|---|
| 6,633,953 B2 | 10/2003 | Stark | |
| 6,643,259 B1 | 11/2003 | Borella et al. | |
| 6,650,644 B1 | 11/2003 | Colley et al. | |
| 6,674,769 B1 | 1/2004 | Viswanath | |
| 6,718,361 B1 | 4/2004 | Basani et al. | |
| 6,738,379 B1 | 5/2004 | Balazinski et al. | |
| 6,769,048 B2* | 7/2004 | Goldberg et al. | 711/141 |
| 6,791,945 B1 | 9/2004 | Levenson et al. | |
| 6,856,651 B2 | 2/2005 | Singh | |
| 6,859,842 B1 | 2/2005 | Nakamichi et al. | |
| 6,910,106 B2 | 6/2005 | Sechrest et al. | |
| 6,968,374 B2 | 11/2005 | Lemieux et al. | |
| 6,978,384 B1 | 12/2005 | Milliken | |
| 7,007,044 B1 | 2/2006 | Rafert et al. | |
| 7,020,750 B2* | 3/2006 | Thiyagaranjan et al. | 711/141 |
| 7,035,214 B1 | 4/2006 | Seddigh et al. | |
| 7,069,342 B1 | 6/2006 | Biederman | |
| 7,113,962 B1 | 9/2006 | Kee et al. | |
| 7,120,666 B2 | 10/2006 | McCanne et al. | |
| 7,145,889 B1 | 12/2006 | Zhang et al. | |
| 7,197,597 B1 | 3/2007 | Scheid et al. | |
| 7,200,847 B2 | 4/2007 | Straube et al. | |
| 7,215,667 B1 | 5/2007 | Davis | |
| 7,242,681 B1 | 7/2007 | Van Bokkelen et al. | |
| 7,243,094 B2 | 7/2007 | Tabellion et al. | |
| 7,266,645 B2 | 9/2007 | Garg et al. | |
| 7,318,100 B2* | 1/2008 | Demmer et al. | 709/229 |
| 7,366,829 B1 | 4/2008 | Luttrell et al. | |
| 7,380,006 B2 | 5/2008 | Srinivas et al. | |
| 7,383,329 B2 | 6/2008 | Erickson | |
| 7,383,348 B2* | 6/2008 | Seki et al. | 709/232 |
| 7,388,844 B1 | 6/2008 | Brown et al. | |
| 7,389,357 B2 | 6/2008 | Duffie, III et al. | |
| 7,389,393 B1* | 6/2008 | Karr et al. | 711/156 |
| 7,417,991 B1 | 8/2008 | Crawford et al. | |
| 7,420,992 B1 | 9/2008 | Fang et al. | |
| 7,428,573 B2 | 9/2008 | McCanne et al. | |
| 7,451,237 B2 | 11/2008 | Takekawa et al. | |
| 7,453,379 B2 | 11/2008 | Plamondon | |
| 7,457,315 B1 | 11/2008 | Smith | |
| 7,471,629 B2 | 12/2008 | Melpignano | |
| 7,532,134 B2 | 5/2009 | Samuels et al. | |
| 7,555,484 B2 | 6/2009 | Kulkarni et al. | |
| 7,571,343 B1 | 8/2009 | Xiang et al. | |
| 7,619,545 B2 | 11/2009 | Samuels et al. | |
| 7,620,870 B2 | 11/2009 | Srinivasan et al. | |
| 7,639,700 B1* | 12/2009 | Nabhan et al. | 370/401 |
| 7,676,554 B1* | 3/2010 | Malmskog et al. | 709/219 |
| 7,714,747 B2 | 5/2010 | Fallon | |
| 7,746,781 B1 | 6/2010 | Xiang | |
| 7,849,134 B2 | 12/2010 | McCanne et al. | |
| 7,853,699 B2 | 12/2010 | Wu et al. | |
| 7,953,869 B2 | 5/2011 | Demmer et al. | |
| 8,140,757 B1 | 3/2012 | Singh et al. | |
| 2001/0054084 A1* | 12/2001 | Kosmynin | 709/218 |
| 2002/0007413 A1* | 1/2002 | Garcia-Luna-Aceves et al. | 709/229 |
| 2002/0040475 A1 | 4/2002 | Yap et al. | |
| 2002/0065998 A1 | 5/2002 | Buckland | |
| 2002/0078242 A1 | 6/2002 | Viswanath | |
| 2002/0101822 A1 | 8/2002 | Ayyagari et al. | |
| 2002/0107988 A1 | 8/2002 | Jordan | |
| 2002/0116424 A1 | 8/2002 | Radermacher et al. | |
| 2002/0131434 A1 | 9/2002 | Vukovic et al. | |
| 2002/0150041 A1 | 10/2002 | Reinshmidt et al. | |
| 2002/0163911 A1 | 11/2002 | Wee et al. | |
| 2002/0169818 A1* | 11/2002 | Stewart et al. | 709/202 |
| 2002/0181494 A1 | 12/2002 | Rhee | |
| 2002/0188871 A1 | 12/2002 | Noehring et al. | |
| 2002/0194324 A1 | 12/2002 | Guha | |
| 2003/0009558 A1* | 1/2003 | Ben-Yehezkel | 709/225 |
| 2003/0123481 A1* | 7/2003 | Neale et al. | 370/466 |
| 2003/0142658 A1 | 7/2003 | Ofuji et al. | |
| 2003/0149661 A1 | 8/2003 | Mitchell et al. | |
| 2003/0233431 A1 | 12/2003 | Reddy et al. | |
| 2004/0008711 A1 | 1/2004 | Lahti et al. | |
| 2004/0047308 A1 | 3/2004 | Kavanagh et al. | |
| 2004/0083299 A1 | 4/2004 | Dietz et al. | |
| 2004/0114569 A1 | 6/2004 | Naden et al. | |
| 2004/0117571 A1 | 6/2004 | Chang et al. | |
| 2004/0123139 A1 | 6/2004 | Aiello et al. | |
| 2004/0199771 A1 | 10/2004 | Morten et al. | |
| 2004/0202110 A1 | 10/2004 | Kim | |
| 2004/0203820 A1 | 10/2004 | Billhartz | |
| 2004/0205332 A1 | 10/2004 | Bouchard et al. | |
| 2004/0243571 A1 | 12/2004 | Judd | |
| 2004/0255048 A1* | 12/2004 | Lev Ran et al. | 709/249 |
| 2005/0010653 A1* | 1/2005 | McCanne | 709/219 |
| 2005/0044270 A1* | 2/2005 | Grove et al. | 709/238 |
| 2005/0053094 A1 | 3/2005 | Cain et al. | |
| 2005/0091234 A1 | 4/2005 | Hsu et al. | |
| 2005/0111460 A1 | 5/2005 | Sahita | |
| 2005/0131939 A1 | 6/2005 | Douglis et al. | |
| 2005/0132252 A1* | 6/2005 | Fifer et al. | 714/15 |
| 2005/0141425 A1 | 6/2005 | Foulds | |
| 2005/0171937 A1 | 8/2005 | Hughes et al. | |
| 2005/0177603 A1* | 8/2005 | Shavit | 707/204 |
| 2005/0190694 A1 | 9/2005 | Ben-Nun et al. | |
| 2005/0210151 A1 | 9/2005 | Abdo et al. | |
| 2005/0220019 A1 | 10/2005 | Melpignano | |
| 2005/0235119 A1 | 10/2005 | Sechrest et al. | |
| 2005/0243743 A1 | 11/2005 | Kimura | |
| 2005/0243835 A1 | 11/2005 | Sharma et al. | |
| 2005/0256972 A1* | 11/2005 | Cochran et al. | 709/245 |
| 2005/0278459 A1 | 12/2005 | Boucher et al. | |
| 2005/0286526 A1 | 12/2005 | Sood et al. | |
| 2006/0013210 A1 | 1/2006 | Bordogna et al. | |
| 2006/0026425 A1 | 2/2006 | Douceur et al. | |
| 2006/0031936 A1 | 2/2006 | Nelson et al. | |
| 2006/0036901 A1* | 2/2006 | Yang et al. | 714/6 |
| 2006/0039354 A1* | 2/2006 | Rao et al. | 370/352 |
| 2006/0059171 A1 | 3/2006 | Borthakur et al. | |
| 2006/0059173 A1 | 3/2006 | Hirsch et al. | |
| 2006/0117385 A1 | 6/2006 | Mester et al. | |
| 2006/0143497 A1 | 6/2006 | Zohar et al. | |
| 2006/0195547 A1 | 8/2006 | Sundarrajan et al. | |
| 2006/0195840 A1 | 8/2006 | Sundarrajan et al. | |
| 2006/0212426 A1 | 9/2006 | Shakara et al. | |
| 2006/0218390 A1 | 9/2006 | Loughran et al. | |
| 2006/0227717 A1 | 10/2006 | van den Berg et al. | |
| 2006/0250965 A1 | 11/2006 | Irwin | |
| 2006/0280205 A1 | 12/2006 | Cho | |
| 2007/0002804 A1 | 1/2007 | Xiong et al. | |
| 2007/0011424 A1* | 1/2007 | Sharma et al. | 711/165 |
| 2007/0076693 A1 | 4/2007 | Krishnaswamy | |
| 2007/0110046 A1 | 5/2007 | Farrell et al. | |
| 2007/0115812 A1 | 5/2007 | Hughes | |
| 2007/0127372 A1 | 6/2007 | Khan et al. | |
| 2007/0130114 A1 | 6/2007 | Li et al. | |
| 2007/0140129 A1 | 6/2007 | Bauer et al. | |
| 2007/0174428 A1* | 7/2007 | Lev Ran et al. | 709/218 |
| 2007/0195702 A1 | 8/2007 | Yuen et al. | |
| 2007/0198523 A1* | 8/2007 | Hayim | 707/10 |
| 2007/0226320 A1* | 9/2007 | Hager et al. | 709/219 |
| 2007/0244987 A1* | 10/2007 | Pedersen et al. | 709/217 |
| 2007/0245079 A1 | 10/2007 | Bhattacharjee et al. | |
| 2007/0258468 A1 | 11/2007 | Bennett | |
| 2007/0263554 A1 | 11/2007 | Finn | |
| 2007/0276983 A1* | 11/2007 | Zohar et al. | 711/100 |
| 2008/0005156 A1 | 1/2008 | Edwards et al. | |
| 2008/0013532 A1 | 1/2008 | Garner et al. | |
| 2008/0016301 A1* | 1/2008 | Chen | 711/162 |
| 2008/0028467 A1 | 1/2008 | Kommareddy et al. | |
| 2008/0133536 A1 | 6/2008 | Bjorner et al. | |
| 2008/0184081 A1 | 7/2008 | Hama et al. | |
| 2008/0229137 A1* | 9/2008 | Samuels et al. | 713/600 |
| 2008/0243992 A1* | 10/2008 | Jardetzky et al. | 709/203 |
| 2008/0313318 A1* | 12/2008 | Vermeulen et al. | 709/225 |
| 2008/0320151 A1* | 12/2008 | McCanne et al. | 709/228 |
| 2009/0060198 A1 | 3/2009 | Little | |
| 2009/0100483 A1* | 4/2009 | McDowell | 725/109 |
| 2009/0158417 A1 | 6/2009 | Khanna et al. | |
| 2009/0175172 A1 | 7/2009 | Prytz et al. | |
| 2009/0234966 A1* | 9/2009 | Samuels et al. | 709/231 |

(56) References Cited

U.S. PATENT DOCUMENTS

| | | | |
|---|---|---|---|
| 2010/0011125 | A1 | 1/2010 | Yang et al. |
| 2010/0020693 | A1 | 1/2010 | Thakur |
| 2010/0115137 | A1 | 5/2010 | Kim et al. |
| 2010/0290364 | A1 | 11/2010 | Black |
| 2010/0318892 | A1* | 12/2010 | Teevan et al. ............ 715/229 |

OTHER PUBLICATIONS

Singh et al. ; "Future of Internet Security-IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, http://www.lancache.com/slcdata.htm.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

You, L. L. et al., "Deep Store an Archival Storage System Architecture" Data Engineering, 2005. ICDE 2005. Proceedings of the 21st. Intl. Conf. on Data Eng., Tokyo, Japan, Apr. 5-8, 2005, pp. 12.

Manber, Udi, "Finding Similar Files in a Large File System", TR 93-33 Oct. 1994, Department of Computer Science, University of Arizona. http://webglimpse.net/pubs/TR93-33.pdf. Also appears in the 1994 winter USENIX Technical Conference.

Knutsson, Bjorn et al., "Transparent Proxy Signalling", Journal of Communications and Networks, vol. 3, No. 2, Jun. 2001.

\* cited by examiner

DEFERRED DATA STORAGE

CROSS-REFERENCE TO RELATED APPLICATIONS

This U.S. Nonprovisional Patent Application is a Continuation application and claims the priority benefit of U.S. Nonprovisional patent application Ser. No. 12/151,839 filed May 8, 2008 and entitled "Network Memory Mirroring," which in turn is a Continuation-In-Part application of and claims the priority benefit of U.S. Nonprovisional patent application Ser. No. 11/998,726 filed Nov. 30, 2007 and entitled, "Deferred Data Storage." All of the above applications are incorporated herein by reference.

BACKGROUND

Technical Field

The present invention relates generally to computer networks and more specifically to deferred data storage.

SUMMARY OF THE INVENTION

A method, system, and computer program for network memory mirroring. Data sent via a local-area network is intercepted at a first hardware appliance of a plurality of hardware appliances in response to a first request for the data. A determination is performed of whether the data has been stored previously in a long-term storage in the first hardware appliance. The data is stored in the long-term storage in the first hardware appliance based on the determination. The data is sent to a second hardware appliance of the plurality of hardware appliances, the first hardware appliance and the hardware central appliance in communication via the local-area network. The data is stored in the long-term storage in the second hardware appliance.

DETAILED DESCRIPTION OF THE INVENTION

A network memory system is often used to improve performance of one or more communication networks. A network memory system generally comprises a first appliance and a second appliance, each operationally coupled to a communication network. The first appliance may receive data and determine whether at least a portion of the data is locally accessible to the second appliance. If at least some of the data is locally accessible to the second appliance, the first appliance may send only that data that is not locally accessible, thereby, in some embodiments, reducing data traffic across the communication network. The second appliance may then combine data received from the first appliance with that data that is locally accessible.

The second appliance may store the recently received data to make that data locally accessible, thereby possibly reducing the time to retrieve that data when needed at a later time. In order to reduce the possibility that data is fragmented within storage, the first appliance and the second appliance may operate in a deferred data storage mode. In the deferred data storage mode, the recently received data combined with the data that was locally accessible may be temporarily stored in a temporary page in memory. A temporary page comprises data of which a decision to store or discard has not been made. When the temporary page is full, a determination is made as to whether the contents of the temporary page will be stored in persistent data storage (i.e., to make the combined data locally accessible to the second appliance) or be discarded. The determination may be based, in part, upon an analysis of possible fragmentation within storage. By deferring the decision to store the combined data, the effects of fragmentation may be reduced.

Figure 1:
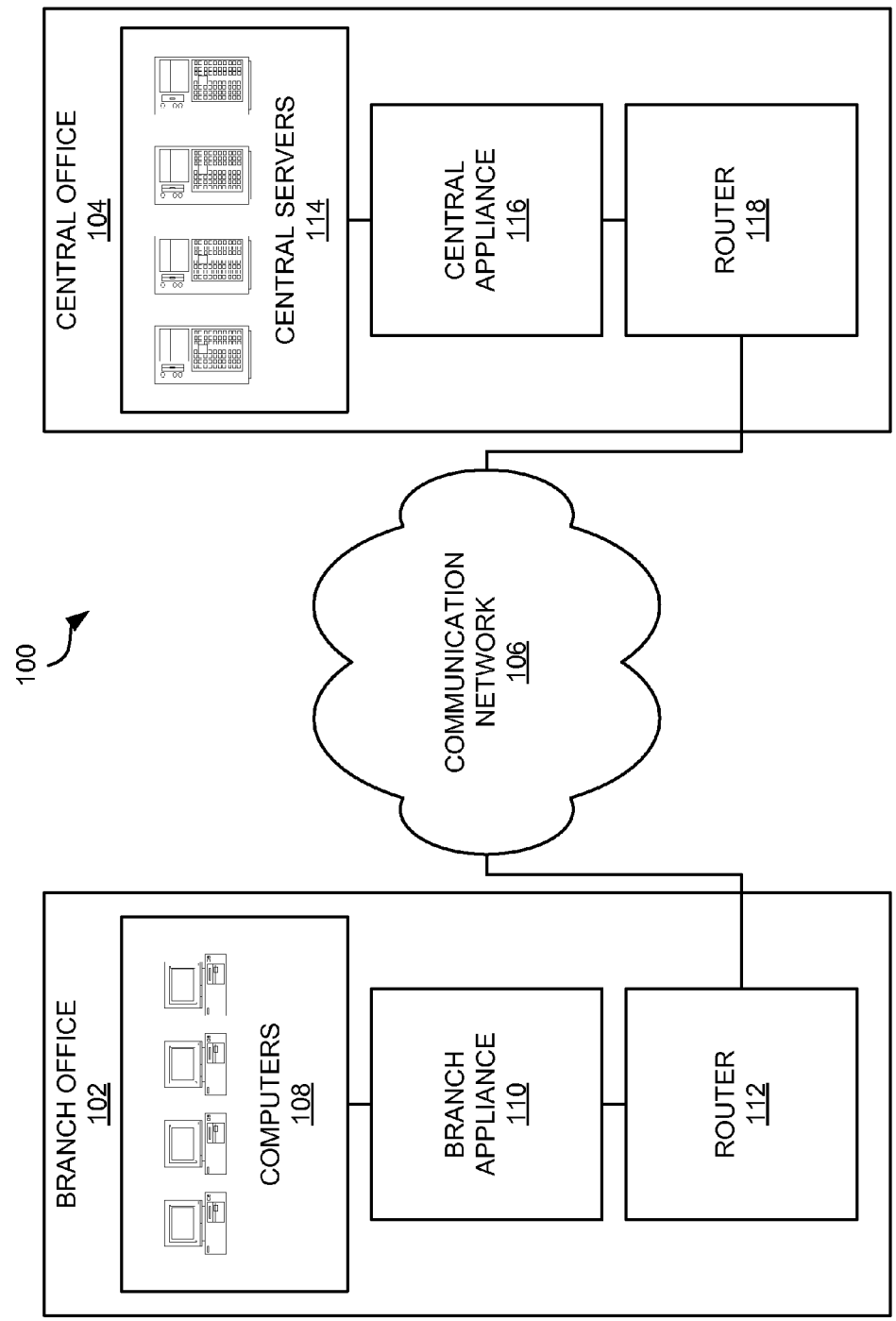
FIG. 1 depicts an exemplary network memory system, according to various embodiments.

FIG. 1 illustrates a network memory system 100 in an exemplary implementation of the invention. The network memory system 100 includes a branch office 102, a central office 104, and a communication network 106. The branch office 102 includes computers 108, a branch appliance 110, and a router 112. The central office 104 includes central servers 114, a central appliance 116, and a router 118.

In the branch office 102, the computers 108 are linked to the branch appliance 110. The branch appliance 110 is linked to the router 112. The router 112 is coupled to the communication network 106. In the central office 104, the central servers 114 are linked to the central appliance 116. The central appliance 116 is linked to the router 118. The router 118 is coupled to the communication network 106.

The principles discussed herein are equally applicable to multiple branch offices (not shown) and to multiple central offices (not shown). For example, the network memory system 100 may include multiple branch offices and/or multiple central offices coupled to the communication network 106. Branch office/branch office communication and central office/central office communication, as well as multi-appliance and/or multi-node communication and bidirectional communication are further within the scope of the disclosure.

However, for the sake of simplicity, the disclosure illustrates the network memory system 100 having the single branch office 102 and the single central office 104, and the respective branch office 102/central office 104 communication.

The communication network 106 comprises hardware and/or software elements that enable the exchange of information (e.g., voice and data) between the branch office 102 and the central office 104. Some examples of the communication network 106 are a private wide-area network (WAN), and the Internet. Typically, connections from the branch office 102 to the communication network 106 (e.g., from the router 112 and the router 118) are ISDN, T1 lines (1.544 Mbps), and possibly broadband connections such as digital subscriber lines (DSL) and cable modems. Other examples are T3 lines (43.232 Mbps), OC3 (155 Mbps), and OC48 (2.5 Gbps), although more costly and more likely used for interconnection at the central office 104 or as the backbone of the communication network 106.

The branch appliance 110 comprises hardware and/or software elements configured to receive data (e.g., email, files, and databases transactions), determine whether a portion of the data is locally accessible to an appliance (e.g., the central appliance 116), generate an instruction based on the determination, and transfer the instruction to the appliance. The branch appliance 110 also comprises hardware and/or software elements configured to receive an instruction from an appliance (e.g., the central appliance 116), process the instruction to obtain data, and transfer the data to a computer (e.g., the computers 108). The data transferred to the computer is referred to as "response data." One example of the branch appliance 110 is described below with respect to FIG. 3. The operations of the branch appliance 110 are discussed in further detail below in FIGS. 4, 5, and 6.

Locally accessible data comprises any data transferable to the computer (e.g., the computers 108 and the central servers 114) by an appliance (e.g., the branch appliance 110 and the central appliance 116) without transferring the data over the communication network 106. In some examples, the locally accessible data is stored in random access memory (RAM) in the branch appliance 110, on a hard drive in the branch appliance 110, and a combination of data stored in RAM and on one or more hard drives in the branch appliance 110. In another example, the locally accessible data is accessible by the branch appliance 110 over a communication network (other than the communication network 106), such as data stored in a network attached storage (NAS) device that is internal or external to the branch office 102. In still another example, the locally accessible data is stored in a database. The database may be stored in RAM, on a hard disk, a combination of RAM and hard disks, in a NAS device, and/or in other optical and flash storage devices.

The instruction comprises any message or signal that indicates to an appliance (e.g., the branch appliance 110 and the central appliance 116) an action to perform with the data. Some examples of the instruction indicate to the appliance to store the data in a memory, to retrieve the data from data storage, and to forward the data to the computer (e.g., the central servers 114 and the computers 108). The instruction may be explicit and/or implicit based on instructions indicating to store or retrieve the data. In some embodiments, the instruction indicates an index within a database for storing and retrieving the data.

The central appliance 116 comprises hardware and/or software elements configured to receive data, determine whether a portion of the data is locally accessible to an appliance (e.g., the branch appliance 110) in the data storage, generate an instruction based on the determination, and transfer the instruction to the appliance. The central appliance 116 also comprises hardware and/or software elements configured to receive an instruction from an appliance (e.g., the branch appliance 110), process the instruction to obtain the response data, and transfer the response data to a computer (e.g., the central servers 114). One example of the central appliance 116 is described below with respect to FIG. 3. The operations of the central appliance 116 are discussed in further detail below in FIGS. 4, 5, and 7.

As illustrated, the branch appliance 110 is configured in-line (or serially) between the computers 108 and the router 112. The central appliance 116 is also configured serially between the central servers 114 and the router 118. The branch appliance 110 and the central appliance 116 transparently intercept network traffic between the computers 108 and the central servers 114. For example, the central appliance 116 transparently intercepts data sent from the central servers 114 and addressed to the computers 108. The computers 108 and the central servers 114 advantageously require no additional configuration because the branch appliance 110 and the central appliance 116 operate transparently.

Alternatively, the branch appliance 110 and the central appliance 116 are configured as an additional router or gateway. As a router, for example, the branch appliance 110 appears to the computers 108 as an extra hop before the router 112. In some embodiments, the branch appliance 110 and the central appliance 116 provide redundant routing or peer routing with the router 112 and the router 118. Additionally, in the bridge and router configurations, the branch appliance 110 and the central appliance 116 provide failure mechanisms, such as, fail-to-open (e.g., no data access) or fail-to-wire (e.g., a direct connection to the router 112).

It will be understood that the branch appliance 110 and the central appliance 116 perform bidirectional communication. For example, data sent to the branch appliance 110 from the central appliance 116 may be stored in a location locally accessible to the central appliance 116 and in a location locally accessible to the branch appliance 110. If the data is to be transferred again from the central appliance 116 to the branch appliance 110, the central appliance 116 may determine that the data is locally accessible to the branch appliance 110 and generate an instruction to the branch appliance 110 to retrieve the data. The central appliance 116 transfers the instruction to the branch appliance 110 and the branch appliance 110 processes the instruction to obtain the data. If later, the branch appliance 110 is to transfer the entire data back to the central appliance 116, the branch appliance 110 may use the fact that the central appliance 116 has before transferred the data to the branch appliance 110. The branch appliance 110 therefore determines that the data is locally accessible to the central appliance 116 and generates an instruction to the central appliance 116 to retrieve the data. The branch appliance 110 transmits the instruction to the central appliance 116 and the central appliance 116 processes the instruction to obtain the data. Therefore, an appliance (e.g., the branch appliance 110 and the central appliance 116) in the network memory system 100 advantageously uses data transferred to and from the appliance to reduce network traffic with other appliances in the network memory system 100.

In exemplary embodiments, the network memory system 100 advantageously provides increased productivity, reduced IT costs, and enhanced data integrity and compliance. For example, the network memory system 100 achieves the simple administration of centralized server systems whereby the central servers 114 store the primary copy of the data. The network memory system 100 improves application performance and data access in the branch office 102 and central office 104 because not every response to a data request travels over the communication network 106 from the central servers 114. The branch appliance 110 and the central appliance 116 also store to and retrieve from a local copy of the data for subsequent exchanges of the data.

Additionally, the network memory system 100 may not cache the data in the traditional sense. The data may be retrieved locally even if the URL or filename for the data is different because the data may be identified by a pattern for the data itself and not by the URL or filename. Furthermore, unlike web caching, the network memory system 100 ensures that the data is coherent by forwarding messages (e.g., data requests and responses) between the computers 108 and the central servers 114. For example, web caching operates by locally intercepting messages for an authoritative source (e.g., a web server) and responding to the messages such that the web server potentially never sees the messages. In some cases, particularly with dynamic content, the locally cached copy may be stale or out-of-date. Advantageously, the network memory system 100 provides data coherency and up-to-date data by the transparent operation of the network memory system 100 and the principle in which messages are transferred end-to-end (e.g., from the computers 108 to the central servers 114), even though the messages and/or the data may not traverse the communication network 106.

In various embodiments, the network memory system 100 may not have the higher cost of distributed server systems because the branch appliance 110 and the central appliance 116 provide benefits across all applications and displace several distributed devices and caches, particularly in multiple branch implementations. In some embodiments, the branch appliance 110 and the central appliance 116 provide internal storage for a secondary copy of the data. The network memory system 100 also reduces the hardware and license costs for the branch office 102 and the central office 104 by eliminating the need for the numerous distributed devices. Further, the network memory system 100 minimizes the security vulnerabilities and patching activities commonly associated with the distributed systems. Management of the branch appliance 110 and the central appliance 116 is simpler than the management of a remote distributed server. Unlike remote servers, there is no need to configure user accounts, permissions, and authentication schemes on the branch appliance 110 and the central appliance 116.

Figure 2:
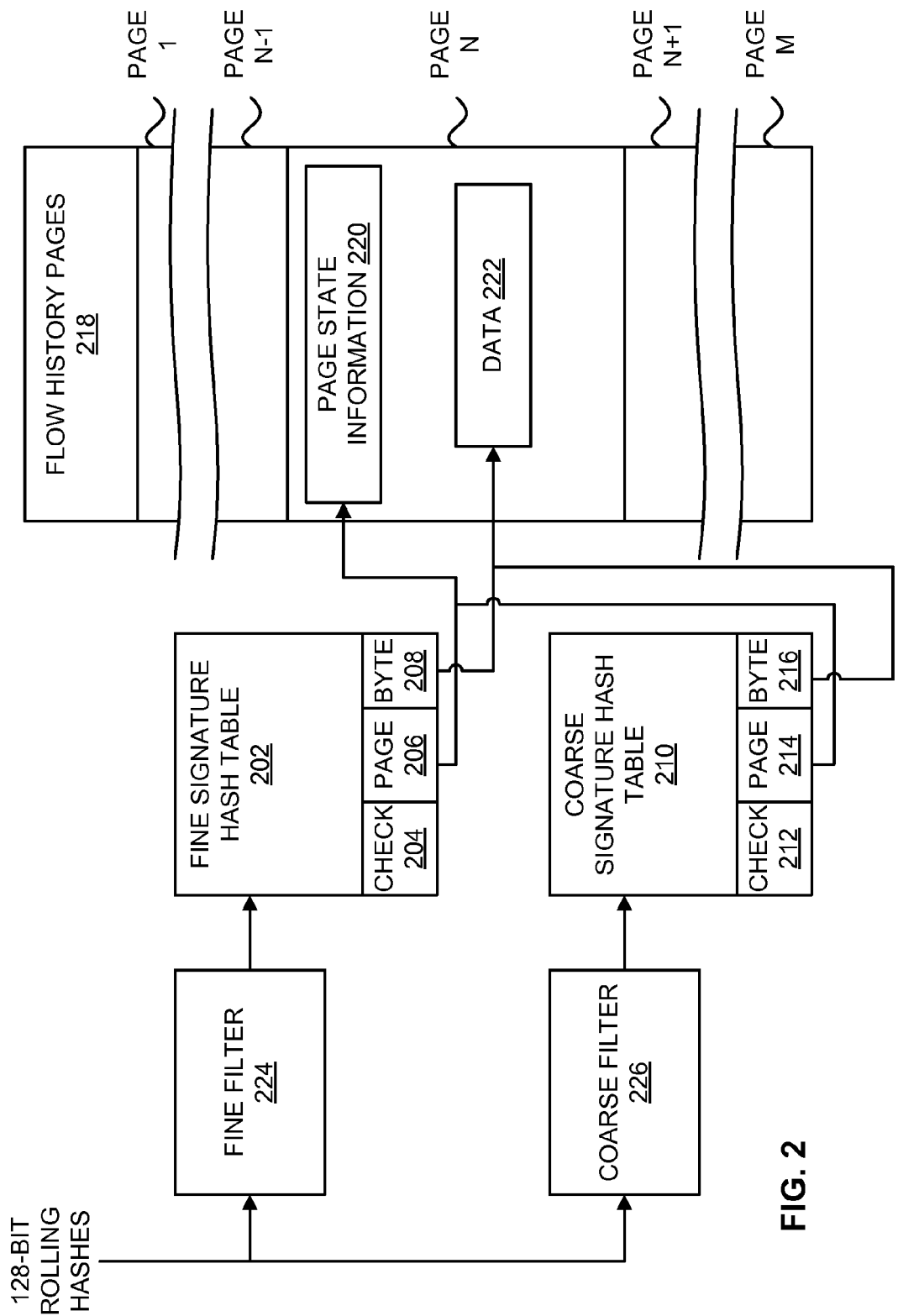
FIG. 2 depicts data structures for the network memory system to determine whether a portion of the data is locally accessible to the branch appliance, according to various embodiments.

FIG. 2 depicts data structures for the network memory system 100 to determine whether a portion of the data is locally accessible to the branch appliance 110, according to various embodiments. The data structures include a fine signature hash table (SHT) 202, a coarse signature hash table (SHT) 210, and flow history pages (FHPs) 218. The fine SHT 202 includes one or more entries comprising a check field 204, a page field 206, and a byte field 208. The coarse SHT 210 includes one or more entries comprising a check field 212, a page field 214, and a byte field 216. The FHPs 218 include one or more pages (e.g., page 1-M). Each page (e.g., page N) includes page state information 220 and stores data 222. The pages may be stored in a location that corresponds to a database as described herein, for example, in connection with FIG. 3.

An appliance of the network memory system 100 (e.g., the branch appliance 110 and the central appliance 116) may calculate hashes at every byte boundary of a data flow (e.g., response data) to be sent across the communication network 106. In some embodiments, the data flow includes packets that are in the same Internet Protocol (IP) flow, as defined by the IP header five tuple of source address, source port, destination address, destination port, and protocol. The hashes may be influenced by preceding bytes in the data flow. For example, the hashes are influenced by approximately the "n" previous bytes, where "n" determines the fingerprint size. Some examples of calculating the hashes are cyclical redundancy checks (CRCs) and checksums over the previous "n" bytes of the data flow. In some embodiments, rolling implementations of CRCs and checksums are used where a new byte is added, and a byte from "n" bytes earlier is removed. To maximize the ability to determine whether a portion of the data flow exists in another appliance in the network memory system 100, the hash calculation may span across successive IP packets in the data flow. In other embodiments, the hash calculation ignores patterns that span one or more IP packet boundaries in the data flow, and the hashes are calculated within a single IP packet.

Each calculated hash is filtered by a fine filter 224 and a coarse filter 226. The appliance designates the locations in the data flow that meet the fine and coarse filter criteria as fine and coarse sync-points, respectively. The fine filter 224 and the coarse filter 226 have different filter criteria. Typically, the filter criteria for the coarse filter 226 are more restrictive and may be used to further filter those hashes that pass the fine filter. In other words, the fine filter produces a fine comb of sync-points and the coarse filter produces a coarse comb of sync-points. One example of the filter criteria is the null filter, which allows results in sync-points at all locations. In another example, the filter criteria declares a fine sync-point when the top five bits of the hashes are all zeros and a coarse filter criteria which stores or compares hashes when the top ten bits of the hashes are all zeros. The hash at the fine sync-points index the fine SHT 202 and the hash at the coarse sync-points index the coarse SHT 210. For example, the index could be derived from the hash by using a number of low order bits from the hash. The filter criteria affect the sizing of the SHTs 202 and 210 and the probability of matching a hash in the SHTs 202 and 210. The more sync-points that are generated the easier repeated data is identified but, the larger the tables (i.e., the SHTs 202 and 210) need to be in order to index a given amount of information for the data flow. Having a coarse and fine table helps optimize this tradeoff. Alternative implementations may use a single table or multiple tables.

The fine SHT 202 is populated with hashes as the data 222 (e.g., the response data) is stored and when the data 222 is recalled from disk or other locally accessible storage. The fine SHT 202 finely indexes the data 222. In some embodiments, the fine SHT 202 holds approximately one entry for every 100 bytes of the data 222. The coarse SHT 210 is populated as the data 222 is stored and is coarsely indexed. For example, the coarse SHT 210 may hold one entry for approximately every 4 kilobytes (KB) of the data 222. The fine SHT 202 and the coarse SHT 210 may be considered short term and long term memory index structures, respectively.

The appliance of the network memory system 100 stores all or part of the calculated hashes in or compares all or part of the hashes to the check field 204 and 212 in the SHTs 202 and 210. For example, the central appliance 116 verifies a "hit" in the fine SHT 202 by comparing the entire calculated hash or a number of residual bits of the calculated hash to the check field 204. If the central appliance 116 finds no matching hashes in the fine SHT 202 or in the coarse SHT 210, the central appliance 116 determines that the response data is not locally accessible to the branch appliance 110. Each calculated hash for the response data in the fine SHT 202 and the coarse SHT 210 is stored or compared depending on the filter criteria for the fine filter 224 and the coarse filter 226.

The appliance of the network memory system 100 indexes each entry in the fine SHT 202 and the coarse SHT 210 to a page (e.g., by setting the page field 206 and the page field 214 to address page N) and byte offset (e.g., by setting the byte field 208 and the byte field 216 to a byte offset of the data 222) in the FHPs 218. For example, the central appliance 116 stores the response data in the FHPs 218 at the page pointed to by the page field 206 and 214 at the byte offset indicated by the byte field 208 and 216. The byte field 208 of each hash in the fine SHT 202 for the response data points to the start of a fine sync-point. The byte field 216 of each hash in the coarse SHT 210 for the response data points to the start of a coarse sync-point.

In this example, the branch appliance 110 includes a fine SHT 202, a coarse SHT 210, and a FHP 218 data structure, and the central appliance 116 includes a fine SHT 202, a coarse SHT 210, and a FHP 218 data structure. Each appliance in the network memory system 100 maintains the separate data structures, which may include separate filter criteria for the fine filter 224 and the coarse filter 226. The page state information 220, in the FHP 218 of each appliance in the network memory system 100, includes page parameters, page ownership permissions, peer state, and a list of valid byte ranges for each appliance in the network memory system 100. The page state information 220 tracks the local state of the page (e.g., the FHP 218 in the branch appliance 110, and what parts of the page are used) and the remote state of the page at peers (e.g., the central appliance 116, and what part of the page in the branch appliance 110 is used by the central appliance 116).

The branch appliance 110 and the central appliance 116 each write the data 222 to an assigned page (e.g., the page N or the page N+1) and may reference a page assigned to another appliance in the network memory system 100. Appliances in the network memory system 100 may discover and reconcile the FHPs 218 assigned to other appliances.

Figure 3:
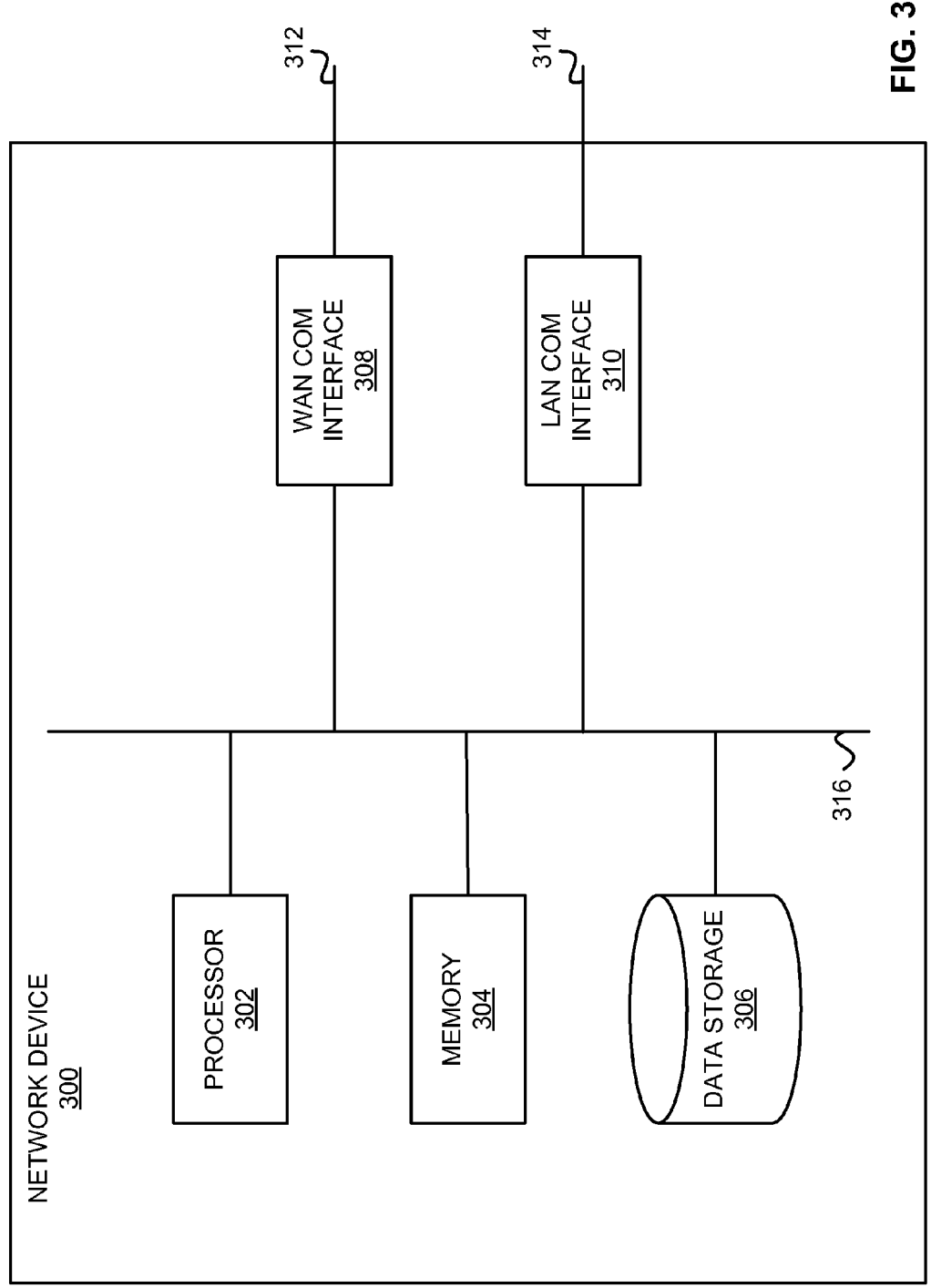
FIG. 3 is a block diagram of an exemplary network device, according to various embodiments.

FIG. 3 is a block diagram of an exemplary network device 300, according to various embodiments. The network device 300 may comprise an appliance such as the branch appliance 110 or the central appliance 116. The network device 300 includes a processor 302, a memory 304, a data storage 306, a WAN communication interface 308, and a LAN communication interface 310. A system bus 316 links the processor 302, the memory 304, the data storage 306, the WAN communication interface 308, and the LAN communication interface 310. Line 312 links the WAN communication interface 308 to the router 112 (in FIG. 1). Line 314 links the LAN communication interface 310 to the computers 108 (in FIG. 1).

The memory 304 may comprise volatile memory to temporarily store pages (such as FHPs 218) until a determination is made whether to store at least one of the FHPs in data storage 306. The memory 304 typically comprises random-access memory (RAM).

The data storage 306 comprises non-volatile memory to persistently store response data such that the response data stored in the data storage 306 can be retrieved later. The data storage 306 may comprise magnetic media such as a disk, EEPROM, and/or the like.

Further, a database may comprise hardware and/or software elements configured to store data in an organized format. The database may organize the data to enable the determination of whether a portion of the data is locally accessible to an appliance, and to enable quick retrieval of locally accessible data to the network device 300. In various embodiments, network memory comprises a database containing information in the network memory data structure of FIG. 2. In one example, the database is distributed (e.g., shared among a plurality of appliances over a network). The database may identify data that is locally accessible to one or more appliances. Data may be located or identified at a specific location (i.e., address) within the database. Similarly, the physical location of the data (e.g., the location of the data within the data storage 306) may be identified within the database.

The hardware and/or software elements of the database may include storage devices, such as RAM, hard drives, optical drives, flash memory, and magnetic tape. In one example, the database may be stored within the data storage 306 and/or memory 304. In another example, the database is shared among a plurality of appliances (e.g., within a plurality of data storages 306 and/or memories 304). In some embodiments, the network device 300 implements a virtual memory system (e.g., the network memory) with linear addresses, the locally accessible data, and the data structures discussed with respect to FIG. 2.

Although the network device 300 comprises a WAN communication interface 308 and a LAN communication interface 310, it will be appreciated that both interfaces may be coupled to any kind of network. In one example, both the WAN communication interface 308 and the LAN communication interface 310 are coupled to a local area network. In another example, the WAN communication interface 308 is coupled to the Internet and the LAN communication interface 310 is coupled to a local or wide area network. Further, it will be appreciated by those skilled in the art that both the WAN communication interface 308 and the LAN communication interface 310 may be supported by a single physical communication interface (e.g., a network adapter that supports two or more connections between the network device 300 and two or more networks). In various embodiments, WAN communication and LAN communication may be supported by a single interface (e.g., data traffic is mixed). There may be any number of interfaces.

Figure 4:
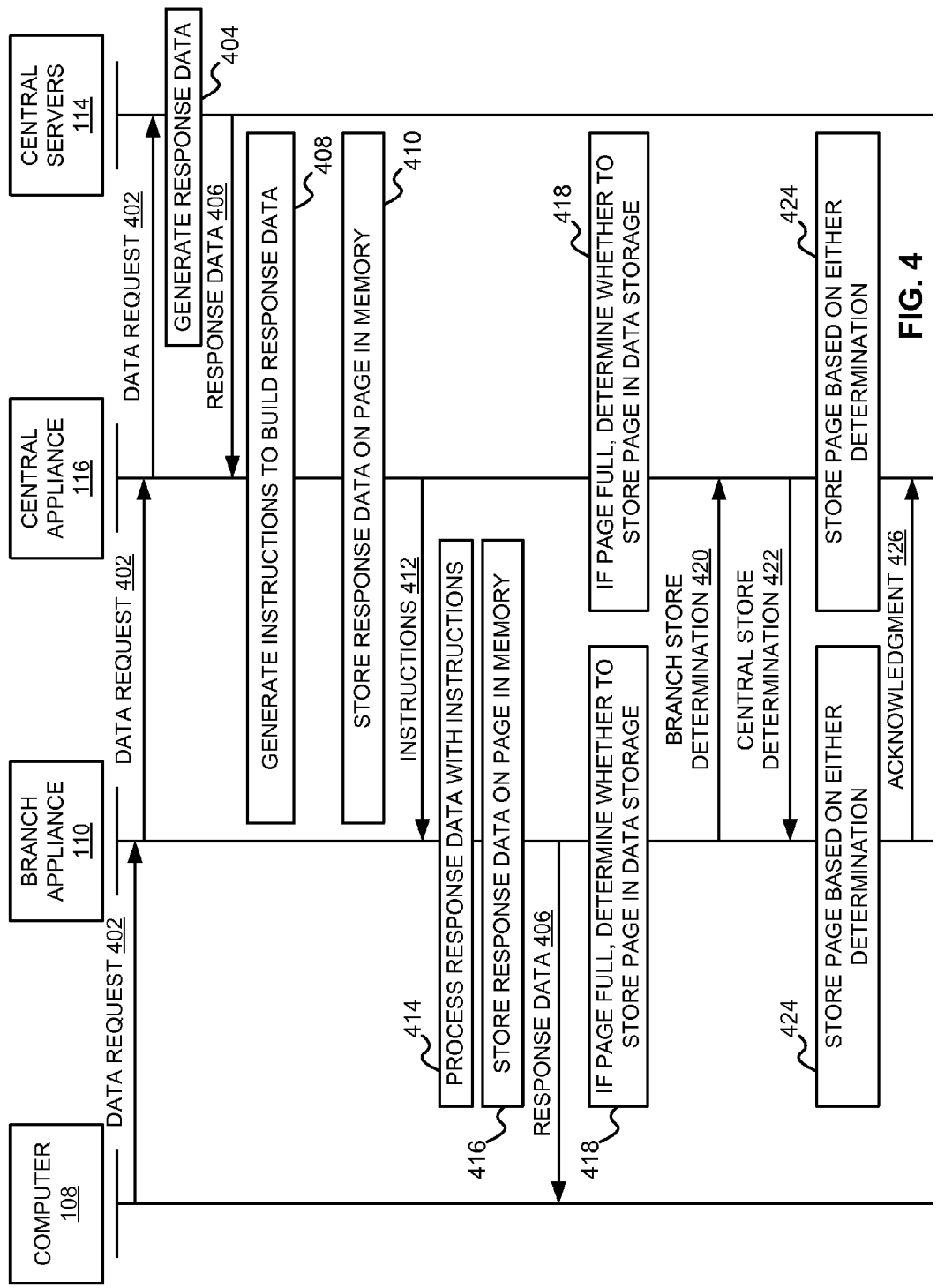
FIG. 4 is a message sequence chart for deferred data storage, according to various embodiments.

FIG. 4 is a message sequence chart for deferred data storage, according to various embodiments. As depicted, the message sequence illustrated in FIG. 4 may be implemented in the network memory system 100. In this example, the computer 108 transmits a data request 402 through the branch appliance 110 and the central appliance 116 to the central server 114. Some examples of the data request 402 are requests for an email attachment, a file, a web page, and a database query.

In sequence 404, the central servers 114 process the data request 402, and generate the response data 406 based on the data request 402. Some examples of the response data 406 are an email message and attachment, a file, a web page, and results retrieved or obtained from the database query. In some embodiments, the central server 114 addresses the response data 406 to the computer 108, however, during transmission, the central appliance 116 transparently intercepts the response data 406. Alternatively, the central servers 114 may transmit the response data 406 to the central appliance 116.

In sequence 408, the central appliance 116 processes the response data 406 to determine whether a portion of the response data 406 is locally accessible to the branch appliance 110. In various embodiments, the central appliance 116 computes hashes for the response data 406 and filters the hashes through the fine filter 224 and the coarse filter 226 to determine any fine and coarse sync-points. The central appliance 116 may then look up any fine sync-points in the fine SHT 202 and coarse sync-points in the coarse SHT 210. Depending on whether at least a portion of the response data 406 is locally accessible to the branch appliance, the central appliance 116 is configured to transmit retrieve instructions to allow the branch appliance 110 to build the response data 406 using data locally accessible to the branch appliance 110.

In sequence 410, the central appliance 116 stores the response data 406 on a temporary page. In the network memory system 100, the response data 406 may be stored in an FHP 218, which may comprise a temporary page and/or a permanent page. The contents within the temporary page may be stored/deleted according to a first-in, first-out (FIFO), least recently used (LRU), or other algorithm as will be apparent to those skilled in the art. In various embodiments, a permanent page may be indexed in the fine SHT 202 and the coarse SHT 210. Regardless of classification, the FHP 218 may be stored in the memory 304 or in the data storage 306.

The central appliance 116 transmits the instructions 412, including any data not locally accessible to the branch appliance 110, to the branch appliance 110. The instructions may comprise a "deferred store instruction," which may include an address associated with the temporary page having at least some of the response data 406. The deferred store instruction may allow the branch appliance 110 to store that response data 406 in a location in the database corresponding to a location in the database of in the central appliance 116.

In sequence 414, the response data 406 is rebuilt based on the instruction 412. The sequence 414 may include retrieving locally accessible data from one or more locations in the data storage 306, assembling the response data into one or more data packets using the retrieved data and the literal data, and/or the like. The response data, when rebuilt, is stored on a temporary page (such as an FHP 218) in sequence 416, based on deferred store instructions. The branch appliance 110 transmits the response data 406 to the computer 108.

Each temporary page may typically contain 256 kilobytes (kB). Thus, if the response data 406 includes less than 256 kB, the temporary page may include response data based on other data requests (not shown). Further, if the response data 406 includes more than 256 kB, the response data 406 may be stored on more than one temporary page in the database.

When a temporary page is full, both the branch appliance 110 and the central appliance 116 may make a determination whether to store the contents of the temporary page in, for example, the data storage 306, in sequence 418. In various embodiments, a separate determination is performed for each temporary page. In other embodiments, a determination is performed for any number of temporary pages. The branch appliance 110 and the central appliance 116 may also separately determine when a temporary page is full and/or when the end of the temporary page is reached.

In alternate embodiments, the temporary page may be treated as full if, for example, a period of time has elapsed since instructions were received. For example, a branch appliance 110 may store response data having less than 256 kB on one of the temporary pages. If no other response data is stored on that temporary page within a predetermined amount of time, such as one minute, the temporary page is treated as if it is full.

Based on at least one determination performed in sequence 418, the branch appliance 110 sends a branch store determination 420 to the central appliance 116. In turn, the central appliance 116, also based on at least one of the determinations performed in sequence 416, sends a central store determination 422 to the branch appliance 110. It is understood that the central store determination 422 may, in some embodiments, be sent simultaneously or prior to the branch store determination 420, as will be apparent to those skilled in the art.

According to various embodiments, the branch store determination 420 and the central store determination 422 include an indication that the response data 406 is to be stored in the data storage 306. The temporary page may be assigned a location in the database (e.g., virtual network memory location). The location in the database may be translatable to a physical address within the data storage 306. In the event that the content of the temporary page is not going to be stored in the data storage 306, the branch store determination 420 and/or the central store determination 422 may indicate that the contents of the temporary page should not be kept. The branch store determination 420 and the central store determination 422 are discussed in greater detail in connection with FIGS. 5-7.

In sequence 424, the contents of the temporary page are stored based on the branch store determination 420 and/or the central store determination 422. The sequence 424 is discussed in greater detail in connection with FIGS. 5-7. The sequence 424 may further include indexing and storing the contents of the temporary page by network memory address in the network memory system 100 as described in connection with FIG. 2. Indexing the contents of the temporary page may additionally include populating the fine SHT 202 and/or the coarse SHT 210 as described in connection with FIG. 2. The branch appliance 110 sends an acknowledgment 426 to the central appliance 116 indicating that the contents of the temporary page are stored at a specific location in the database. The acknowledgement may include an integrity check or hash, which may assist the appliances to verify that the same data is being stored.

Figure 5:
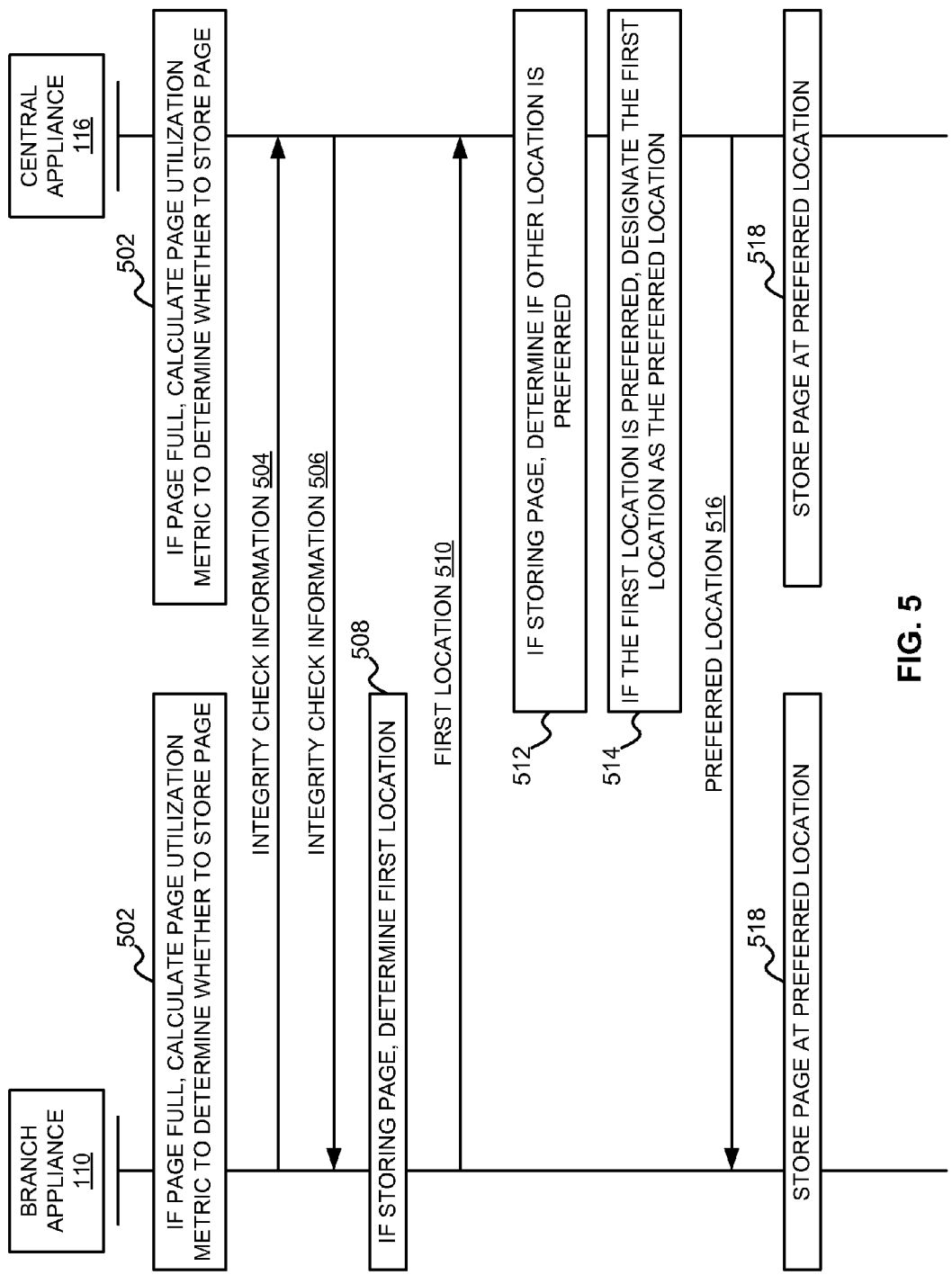
FIG. 5 is a message sequence chart for determining a preferred location, according to various embodiments.

FIG. 5 is a message sequence chart for determining a preferred location, according to various embodiments. In sequence 502, a page utilization metric is calculated to determine whether to store the page. The page utilization metric is a quantitative comparison of the contents of the temporary page (comprising rebuilt packets) to data in the database. The page utilization metric may comprise a total match count of the bytes within the page and found bytes in the database. In some embodiments, the total match count may be calculated as one or more packets are rebuilt based on the instructions (e.g., sequence 414). The page utilization metric may be expressed as a percentage of the contents of the temporary page that matches a part of the database. The determination to store the temporary page may be performed by comparing the page utilization metric to a threshold, such as 90%. Those skilled in the art will appreciate that any threshold may be used.

To illustrate, a page utilization metric may indicate that 45% of the rebuilt data matches data found in a part of the database. In this instance, if the threshold is 90%, the contents of the temporary page will be stored in the database. In one example, the data within the temporary page (i.e., page content) is stored in the data storage 306 and changes are made to the database to indicate the data.

In contrast, if a page utilization metric indicates that 97% of the rebuilt data matches data found in the database, the contents of the temporary page may be discarded. The determination to discard the contents of the temporary page may also be based on whether the found data is stored on the other appliance. In some embodiments, the appliance tracks what has been stored in the other appliance using, for example, peer tables, to track pages that have been sent to or received from the other appliance. In this instance, 97% of the data within the temporary page is also locally accessible to the branch appliance. Thus, the contents of the temporary page may be discarded.

After the determination is made, the branch appliance 110 may send integrity check information 504 to the central appliance 116. The integrity check information 504 may be generated based on the contents of the temporary page and may comprise a CRC, checksum, hash value, or the like. The central appliance 116 may similarly generate integrity check information 506. Based on a comparison of the integrity check information 504 and 506, the branch appliance 110 and the central appliance 116 are able to determine whether the contents of the temporary page in the branch appliance 110 match the contents of the temporary page in the central appliance 116. If the integrity check information 504 and 506 do not match, the contents of both temporary pages may be discarded. In some embodiments, the integrity check information 504 and 506 may be communicated with the first location 510 and the preferred location 516, discussed later herein.

If the integrity check information 504 and 506 do match, the branch appliance, in sequence 508, determines a first location 510 in the database at which to store the data. The branch appliance 110 sends the first location 510 to the central appliance 116.

If the central appliance 116 has determined that the contents of the temporary page should be stored in the database, the central appliance 116 may determine whether the first location is preferred in sequence 512. If the first location is preferred, the central appliance 116 may designate the first location as the preferred location in sequence 514.

If, however, the first location is not acceptable, the central appliance 116 may determine that another location is the preferred location 516. The other location 516 may correspond to an address in the database in which the central appliance 116 previously directed another branch appliance 110 to store a copy of the contents of the temporary page. In some embodiments, the preferred location 516 may indicate that the central appliance 116 determined that the temporary page is to be discarded. The preferred location 516 is sent to the branch appliance 110.

In sequence 518, performed substantially in parallel in both the branch appliance 110 and the central appliance 116, the contents of the temporary page are stored at the preferred location 516. The contents of the stored page may be indexed within network memory as described in connection with FIG. 2. It should be noted that the message sequence chart depicted in FIG. 5 is illustrative of various embodiments. As will be apparent to one skilled in the art, other message sequences may be used.

Figure 6:
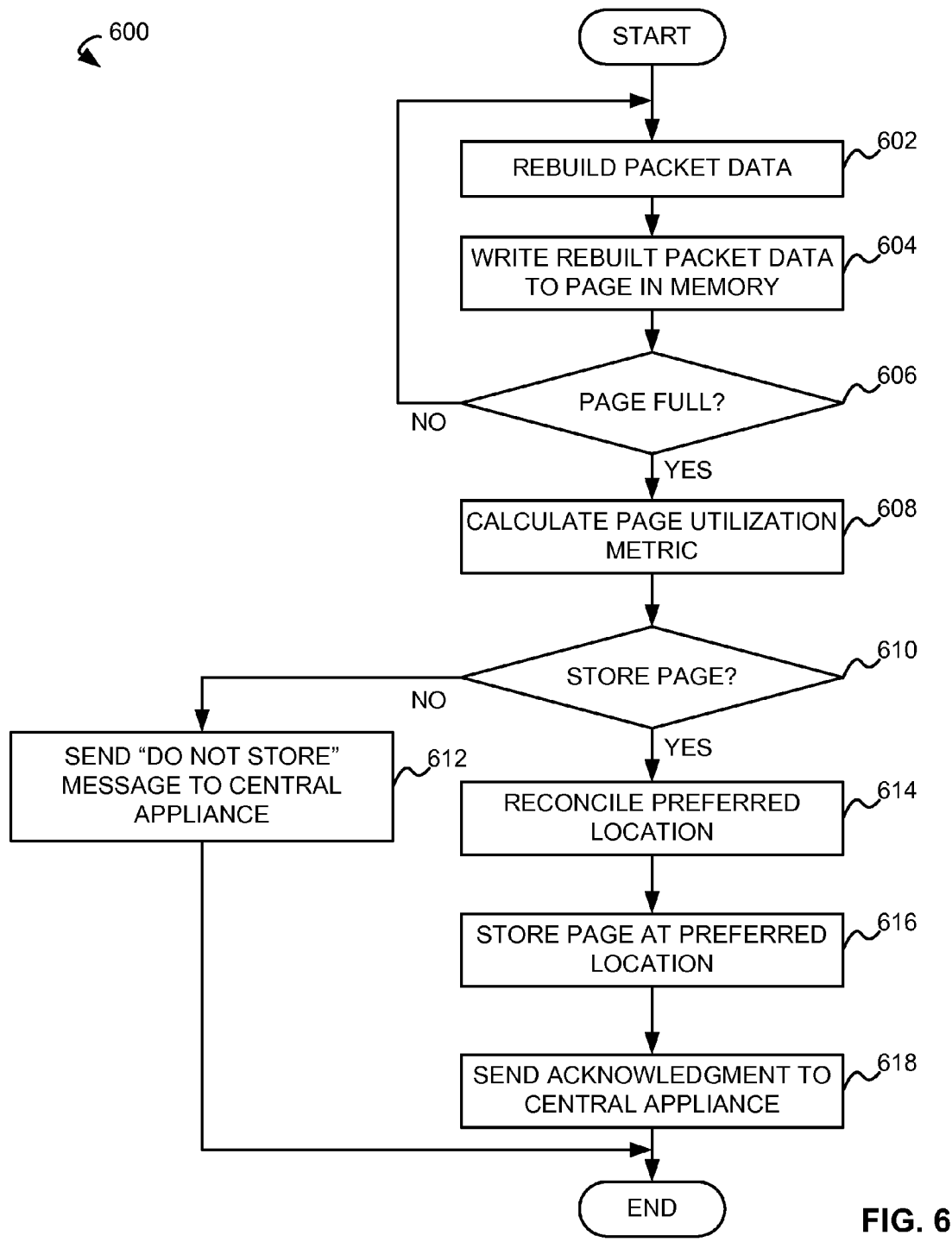
FIG. 6 is a flowchart of a method for deferred data storage in a branch appliance, according to various embodiments.

FIG. 6 is a flowchart of a method 600 for deferred data storage in a branch appliance 110, according to various embodiments.

In step 602, packet data is rebuilt according to instructions and literal data received from a network device. The packet data may include the response data 406.

In step 604, the rebuilt packet data is written to a temporary page. The temporary page may be stored in RAM.

In step 606, a determination is made as to whether the temporary page is full. In some embodiments, the temporary page may be treated as full if the packet data has been stored thereon for a predetermined amount of time. If the page is not full, the method 600 returns to step 602.

In step 608, if the temporary page is full, the page utilization metric is calculated to compare the rebuilt packet data to data within a database such as a database within network memory.

In step 610, based on a comparison of the page utilization metric to a threshold value, a determination is made as to whether to store the contents of the temporary page in the data storage 306.

In step 612, if the determination of step 610 is made to discard the contents of the temporary page, a "do not store" message is sent to the network device (e.g., central appliance 116).

In step 614, if the determination of step 610 is made to store the contents of the temporary page, the preferred location within the database is reconciled. The reconciliation may include one or more communications with the network device. In some embodiments, the message sequence depicted in FIG. 5 may be used.

In step 616, the contents of the temporary page are stored at a page in the preferred location. The preferred location may correspond to a location or address within the database (e.g., within the network memory system). The contents of the temporary page, or a portion thereof, may be written to the data storage 306 at a physical address.

In step 618, an acknowledgement is sent to the network device (e.g., the central appliance 116).

Figure 7:
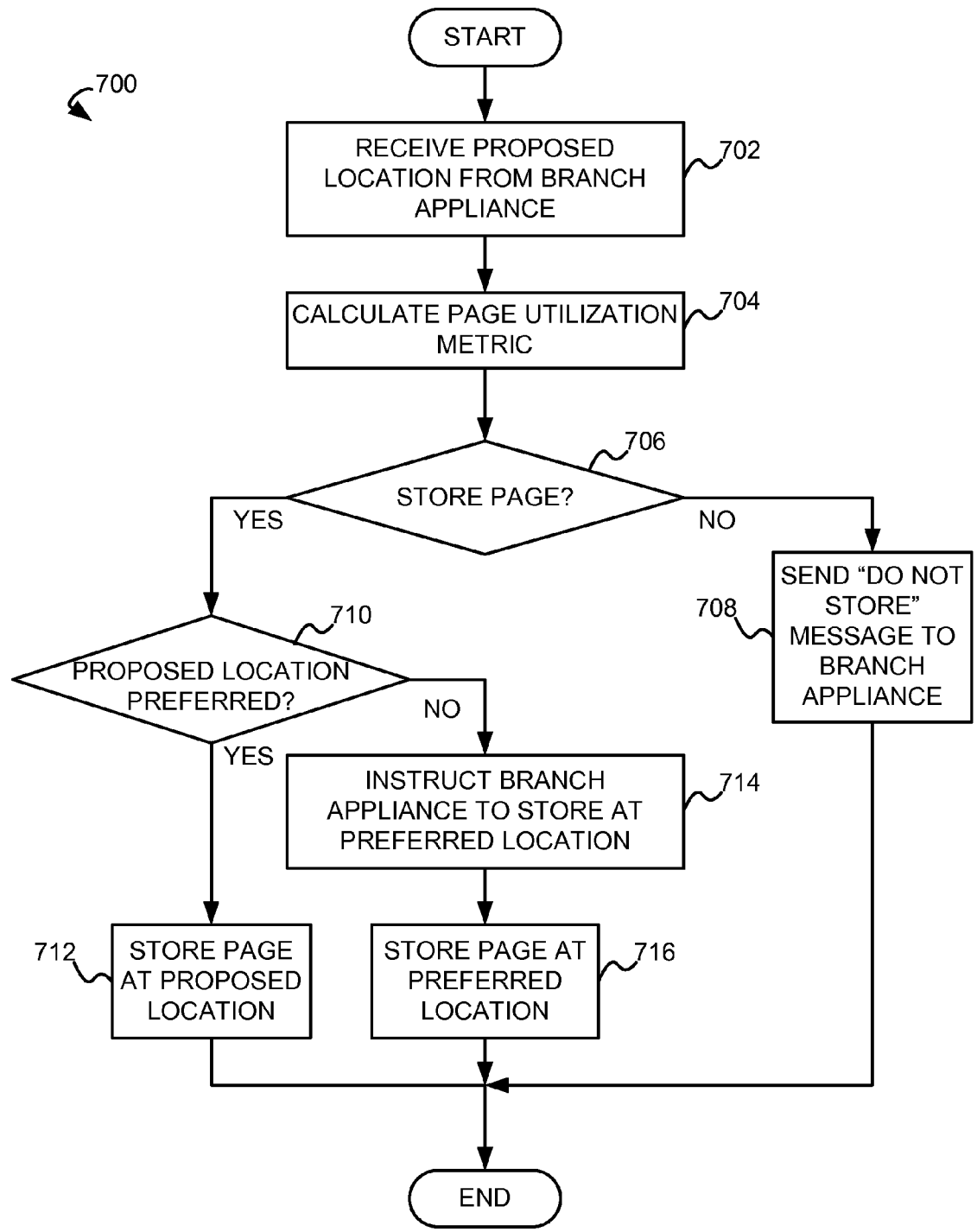
FIG. 7 is a flowchart of a method for deferred data storage in a central appliance, according to various embodiments.

FIG. 7 is a flowchart of a method 700 for deferred data storage in a central appliance 116, according to various embodiments. The method 700 may be performed to determine a preferred location (e.g., step 614) with another network device.

In step 702, a proposed location is received from a network device (e.g., the branch appliance 110).

In step 704, a page utilization metric is calculated to compare rebuilt packet data to data within the database.

In step 706, based on a comparison of the page utilization metric to a threshold value, a determination is made as to whether to persistently store the contents of the temporary page.

In step 708, if the determination of step 706 is made to discard the contents of the temporary page, a "do not store" message is sent to the network device (e.g., branch appliance 110).

In step 710, if the determination of step 706 is made to store the contents of the temporary page, a second determination is made as to whether the received location is preferred.

In step 712, if the proposed location is preferred, the contents of the temporary page are stored at the proposed location. Optionally, an instruction indicating that the proposed location is preferred may be sent to the network device (e.g., branch appliance 110) (not shown).

In step 714, if the received location is not acceptable, the network device (e.g., branch appliance 110) is instructed to store the contents of the temporary page at a preferred location. The preferred location may be based on data already stored in the database corresponding to a third network device.

In step 716, the temporary page is stored at the preferred location having a corresponding address in the database.

According to various embodiments, a site may include a plurality of appliances when, for example, the site is large and there may be a need to distribute network traffic load across the plurality of appliances. The plurality of appliances may be physically configured in a variety of ways.

Figure 8:
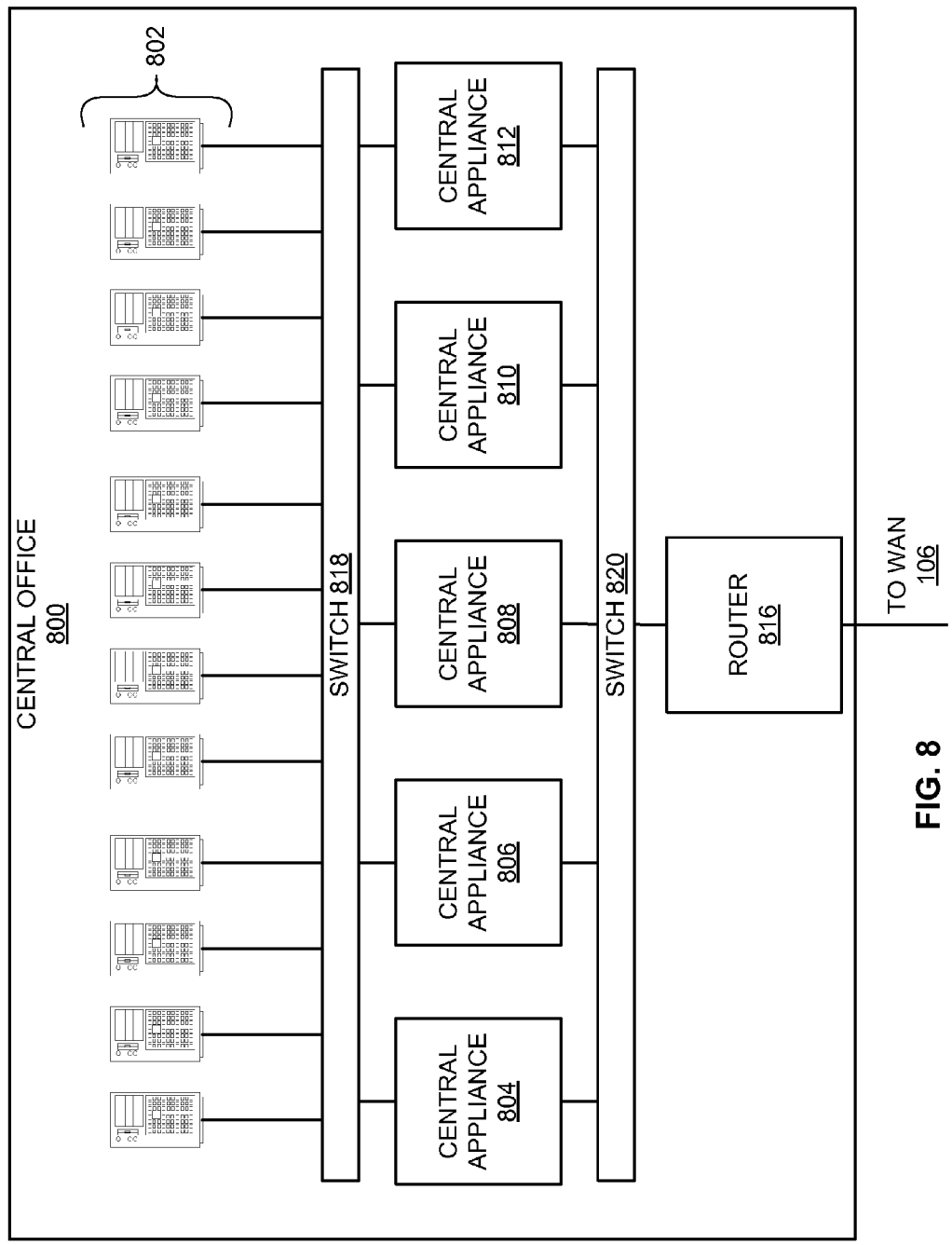
FIG. 8 depicts an exemplary central office configuration having a plurality of central appliances, according to one embodiment.

FIG. 8 depicts an exemplary central office 800 configuration having a plurality of central appliances 804-812, according to one embodiment. The central office 800 may be included in a network memory system such as the network memory system 100. The central office 800 may comprise central servers 802, central appliances 804-812, a router 816, and switches 818 and 820. In exemplary embodiments, the central servers 802 are coupled in communication to the central appliances 804-812 via the switch 818. Furthermore, the central appliances 804-812 are coupled in communication with the router 816 via the switch 820. The router 816 is coupled in communication to the communication network 106. In the central office 800, the central appliances 804-812 are arranged in what may be referred to as an in-path configuration, as discussed in further detail herein. Those skilled in the art will appreciate that the router 816 may perform the same functions as, or otherwise include, the switch 820.

Figure 9:
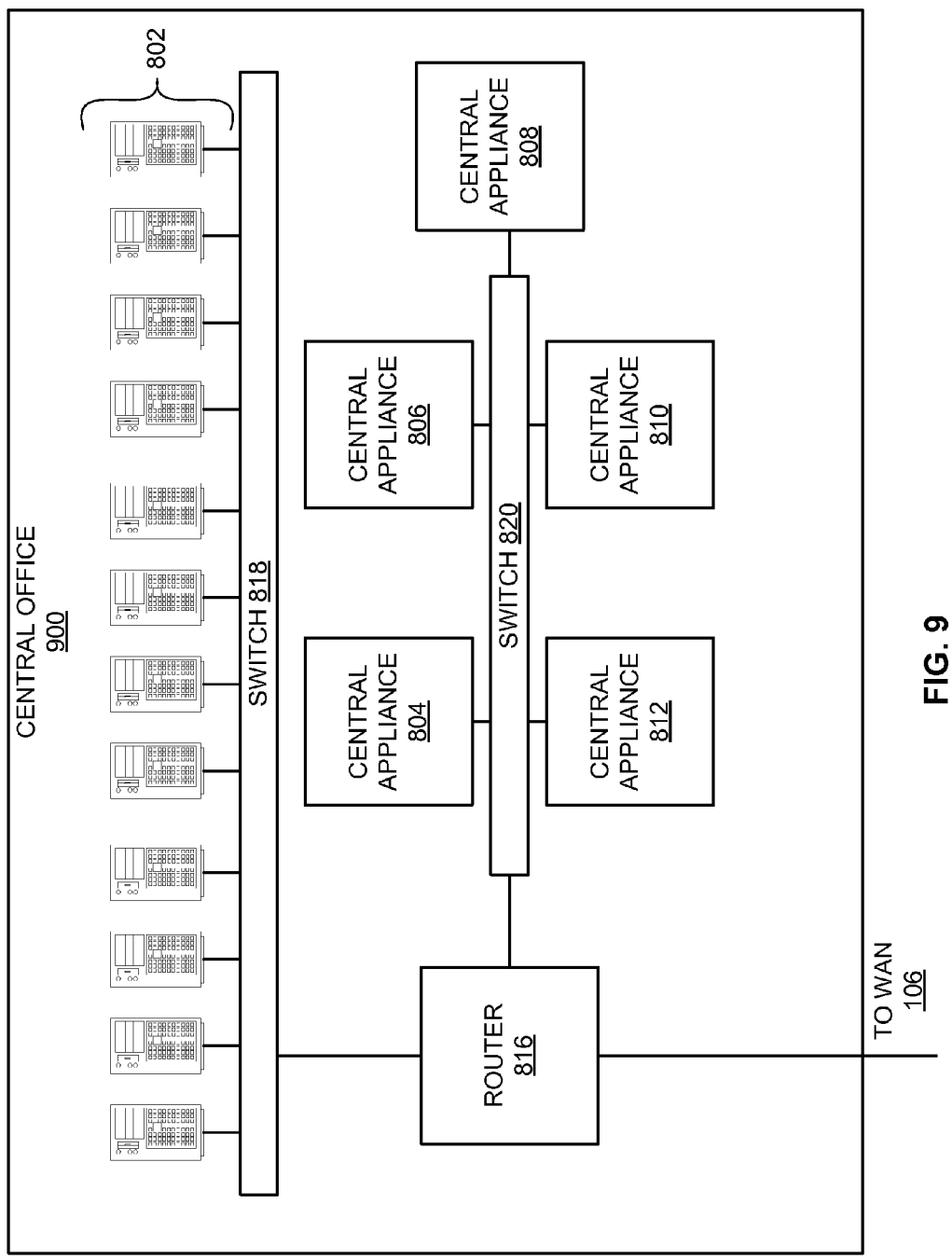
FIG. 9 depicts another exemplary central office configuration having the plurality of appliances, according to an alternate embodiment.

FIG. 9 depicts another exemplary central office 900 configuration having the plurality of appliances 804-812, according to an alternate embodiment. The central office 900 may be included in a network memory system such as the network memory system 100. The exemplary central office 900 comprises central servers 802, central appliances 804-812, a router 816, and switches 818 and 820. In the present embodiment, the central servers 802 and the central appliances 804-812 are all in communication with the router 816 via the switches 818 and 820, respectively. The router 816 is also coupled in communication to the communication network 106. In the central office 900, the central appliances 804-812 are arranged in what may be referred to as an out-of-path configuration, as discussed in further detail herein. Those skilled in the art will appreciate that the router 816 may perform the same function as, or otherwise include, the switch 818 and/or the switch 820.

In either configuration (i.e., in-path or out-of-path as depicted in FIGS. 8 and 9, respectively), the central servers 802 do not require any software configuration, reconfiguration, or modification. In exemplary embodiments, the central appliances 804-812 will appear transparent to the central servers 802 as well as other computers (not depicted) coupled to the communication network 106.

The principles discussed herein are equally applicable to various alternate central office configurations (not shown). For example, the central office 800 and the central office 900 may include any number of central servers 802 and central appliances 804-812. Other examples of alternate central office configurations may include replacing the router 816 in either the central office 800 or the central office 900 with a different device, such as a load balancer. Further, there may be a number of router protocols, such as WCCP (Web Cache Communication Protocol) and PBR (Policy Based Routing), that may allow the router 816 to transparently route network traffic to the central appliances 804-812. Also, as one skilled in the art would recognize, a switch (e.g., the switches 818 and 820) may be replaced by a hub.

The principles discussed herein are equally applicable to office configurations other than central office configurations (e.g., branch office configurations). However, for the sake of simplicity, the exemplary embodiments of the central office configurations illustrated in FIGS. 8 and 9 are described herein.

The central appliances 804-812 each comprise hardware and/or software elements configured to receive data, determine whether a portion of the data is locally accessible to an appliance (e.g., the branch appliance 110 and the central appliances 116, 804-812) in a data storage, generate an instruction based on the determination, and transfer the instruction to the appliance. In one example, the central appliances 804-812 may also each comprise hardware and/or software elements configured to receive an instruction from an appliance (e.g., the branch appliance 110 and the central appliances 116, 804-812), process the instruction to obtain response data, and transfer the response data to a computer (e.g., the central servers 114).

As discussed herein, locally accessible data comprises any data accessible to the appliance (e.g., the central appliances 804-812) without transferring the data over the communication network 106. Furthermore, the locally accessible data may be stored in a long-term storage (e.g., the memory 304 and/or the data storage 306). The long-term storage may be internal or external to the appliance.

The central appliances 804-812 may include the long-term storage. In some embodiments, contents of the long-term storage of one central appliance (e.g., the central appliance 804) may be substantially identical to the contents of the long-term storage of another central appliance (e.g., the central appliance 806).

One example of the central appliances 804-812 is described herein with respect to FIG. 3. The operations of the central appliances 804-812 are discussed in further detail herein with respect to FIGS. 10-13. According to some embodiments, the operations of the central appliances 804-812 may be similar to the operations of the central appliance 116, as described herein with respect to FIGS. 4-6. It will be understood that the central appliances 804-812 perform bidirectional communication similar to the central appliance 116.

According to various embodiments, the central appliances 804-812 may be configured in-path between the central servers 802 and the router 816, as illustrated in FIG. 8. In these embodiments, the central appliances 804-812 transparently intercept network traffic between the central servers 802 and other computers coupled to the communication network 106 (e.g., the computers 108 and the central servers 114). Alternatively, the central appliances 804-812 may be configured as an additional router or gateway as discussed with respect to the central appliance 116.

According to other embodiments, the central appliances 804-812 may be configured out-of-path (e.g., being linked to the router 816 between the central servers 802 and the communication network 106), as illustrated in FIG. 9. Similar to the in-path configuration, the central appliances 804-812 configured out-of-path may transparently intercept network traffic between the central servers 802 and other computers coupled to the communication network 106 (e.g., the computers 108 and the central servers 114).

In both of the central office 800 and the central office 900, the router 816 (or load balancer) may distribute requests for data across the appliances. In one example, once a particular data flow is assigned to an appliance, the particular data flow will stay with the appliance until the particular data flow ends. In addition, the loads are generally distributed equally to the appliances, although the load distribution may be configured to be unequal in some cases.

In an example where network memory mirroring is not used, two separate requests for the same data may be assigned by the router 816 to two separate central appliances 804 and 806, respectively, at the central office 800 or 900. Once the first request is assigned to the central appliance 804, and the request is processed, the contents of the long term storage of the central appliance 804 are different from the contents of the long term storage of central appliance 806. As a result, network memory may not be used to reduce network traffic when the second request for the same data is assigned to the second central appliance 806. Once network memory mirroring is implemented, however, the contents of the long term storage of the central appliance 804 may be the same as the contents of the long term storage of the central appliances 806-812. As a result of network memory mirroring, network memory may be used to reduce network traffic when subsequent requests for the same or similar data are assigned to any of the central appliances 804-812.

Figure 10:
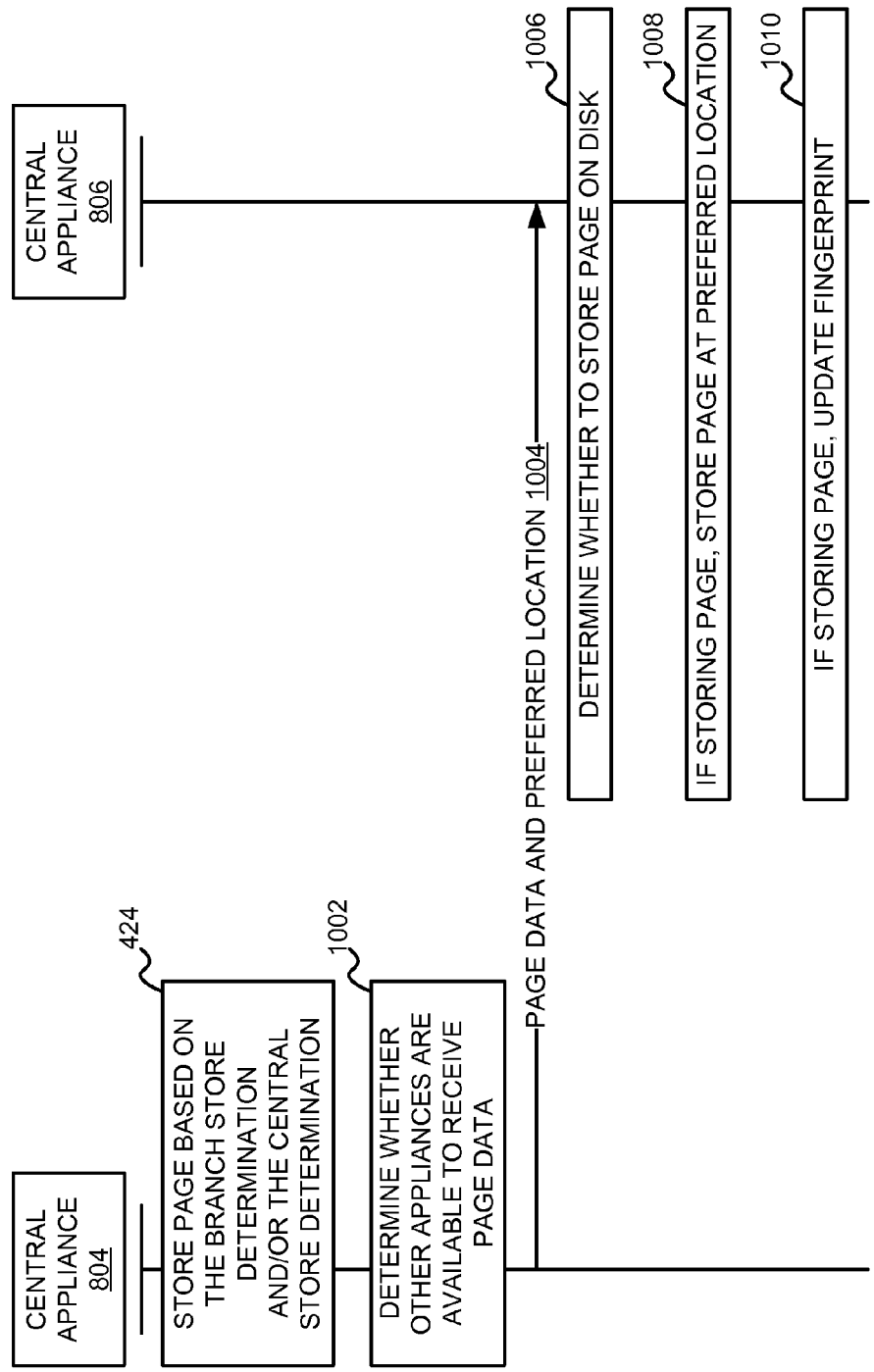
FIG. 10 is a message sequence chart for network memory mirroring, according to various embodiments.

FIG. 10 is a message sequence chart for network memory mirroring, according to various embodiments. Network memory mirroring may be implemented at sites with various physical configurations, including the central office 800 and the central office 900. According to the present embodiment, network memory mirroring may commence subsequent to deferred data storage (e.g., as described by FIG. 4). Those skilled in the art would recognize that network memory mirroring may commence concurrently or prior to deferred data storage.

In sequence 424, the central appliance 804 stores the contents of the temporary page based on the branch store determination 420 and/or the central store determination 422. In some embodiments, the preferred location may be determined according to a message sequence similar to the message sequence depicted in FIG. 5. In other embodiments, the preferred location may be based on data already stored in the database corresponding to a third network device. The sequence 424 is discussed in greater detail in connection with FIGS. 5-7.

After the central appliance 804 stores the contents of the temporary page at the preferred location, the central appliance 804 determines whether other appliances (e.g., the central appliance 806-812) are available to receive data in sequence 1002. According to various embodiments, factors of the determination may include current work load of the other appliances.

Based on the determination that the central appliance 806 is available to receive data, page data and preferred location 1004 are sent to the central appliance 806. In exemplary embodiments, the page data and preferred location 1004 may be sent to a plurality of appliances (e.g., the central appliances 806-812) wherein the following sequences may also commence. In some embodiments, in an instance that the work load of one of the other appliances is too high, the central appliance 804 may not send the page data and preferred location 1004 to that appliance.

In sequence 1006, the central appliance 806 determines whether to store a page based on the received page data and preferred location 1004. In sequence 1008, the central appliance 806 locally stores the page based at least on the determination made in sequence 1006. The preferred location is a network memory location (i.e., a virtual location) rather than a physical location.

In sequence 1010, the central appliance 806 updates a hash table (e.g., fine signature hash table 202 and/or the coarse signature hash table 210) based at least on the determination made in sequence 1006. According to some embodiments, the central appliance 804 may receive an acknowledgement from the central appliance 806 subsequent to the sequence 1010.

For purposes of this figure, the central appliances 804 and 806 may be termed as local hardware appliances and the branch appliance 110 may be termed as a remote hardware appliance. Those skilled in the art will appreciate that, in other perspectives, the branch appliance 110 may be termed as a local hardware appliance and the central appliances 804 and 806 may be termed as remote hardware appliances. In either event, the two central appliances 804 and 806 are either both local hardware appliances or both remote hardware appliances.

Figure 11:
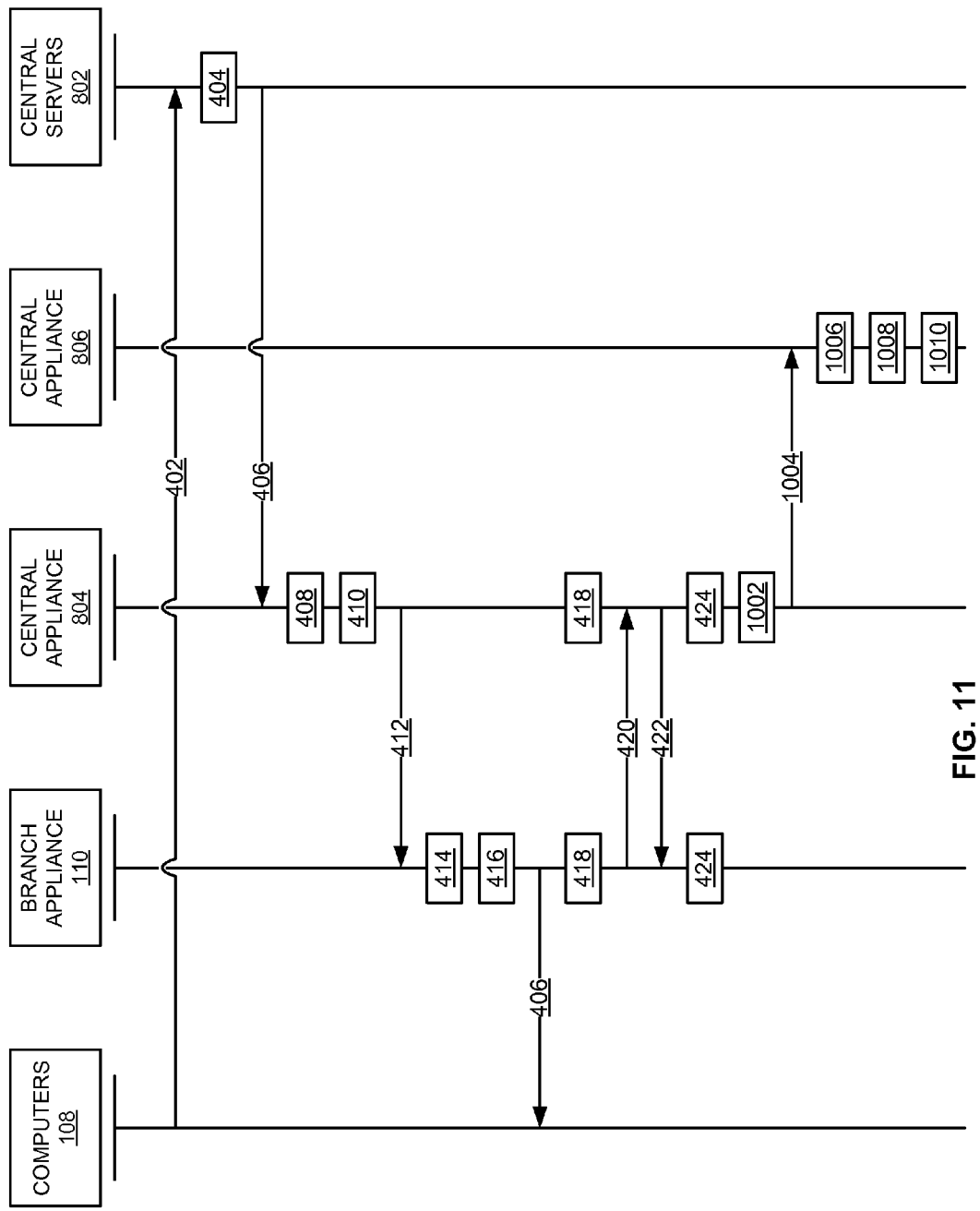
FIG. 11 is a message sequence chart for deferred data storage including network memory mirroring, according to various embodiments.

FIG. 11 is a message sequence chart for deferred data storage (e.g., as described by FIG. 4), including network memory mirroring, according to various embodiments. In this example, a network memory system is depicted that is similar to the network memory system illustrated in FIG. 4 with an exception that the central appliance 116 is replaced by a plurality of central appliances (e.g., the central appliance 804 and the central appliance 806). Furthermore, the central servers 114 are replaced by the central servers 802. Note in FIG. 11 that textual sequence labels have been omitted for conciseness and that numeric sequence labels correspond to numeric sequence labels of FIGS. 4 and 10. Additionally, in FIG. 11, the central appliances 804 and 806 may be arranged in-path (e.g., as illustrated in FIG. 8) or out-of-path (e.g., as illustrated in FIG. 9).

In the example illustrated in FIG. 11, the computer 108 sends the data request 402 to the central servers 802. One skilled in the art will recognize that any sent or transmitted data request or data (e.g., the data request 402) may or may not pass through the branch appliance 110, the central appliance 804, the central appliance 806, or any combination thereof. The deferred data storage sequences 404-424 follow similarly in FIG. 11 as in FIG. 4. In sequence 404, the central servers 802 process the data request 402, and generate the response data 406 based on the data request 402. During transmission of the response data 406, the central appliance 804 transparently intercepts the response data 406. In sequence 408, the central appliance 804 processes the response data 406 to determine whether a portion of the response data 406 is locally accessible to the branch appliance 110. In sequence 410, the central appliance 804 stores the response data 406 on a temporary page. The central appliance 804 transmits the instructions 412, including any data not locally accessible to the branch appliance 110, to the branch appliance 110. In sequence 414, the response data 406 is rebuilt based on the instructions 412. In sequence 416, the response data 406 is stored on a temporary page at the branch appliance 110. The branch appliance 110 may then transmit the response data 406 to the computer 108. It should be noted that, in exemplary embodiments, the computers 108 cannot distinguish whether the response data 406 was sent through the branch and central appliances 110 and 804.

In FIG. 11, when a temporary page is full, both the branch appliance 110 and the central appliance 804 may make a determination whether to store the contents of the temporary page in, for example, the data storage 306 in sequence 418. Based on at least one determination performed in sequence 418, the branch appliance 110 sends the branch store determination 420 to the central appliance 804. In turn, the central appliance 804, also based on at least one of the determinations performed in sequence 418, sends the central store determination 422 to the branch appliance 110. In exemplary embodiments, the branch store determination 420 and the central store determination 422 contains the preferred location within network memory. In sequence 424 at the branch appliance 110, the contents of the temporary page are stored based on the branch store determination 420 and/or the central store determination 422. Likewise, in sequence 424 at the central appliance 804, the contents of the temporary page may be stored based on the branch store determination 420 and/or the central store determination 422.

In accordance with the embodiment illustrated in FIG. 11, after the deferred data storage sequences 404-424, network memory mirroring may commence as discussed in connection with FIG. 10. In sequence 1002, the central appliance 804 determines whether the central appliance 806 is available to receive data. Based on the determination that the central appliance 806 is available to receive data, the page data and preferred location 1004 are sent to the central appliance 806. In sequence 1006, the central appliance 806 determines whether to store the page based on the received page data and preferred location 1004. In sequence 1008, the central appliance 806 stores the page at the preferred location in network memory based at least on the determination made in sequence 1006. In sequence 1010, the central appliance 806 updates a hash table (e.g., fine signature hash table 202 and/or the coarse signature hash table 210) based at least on the determination made in sequence 1006.

Figure 12:
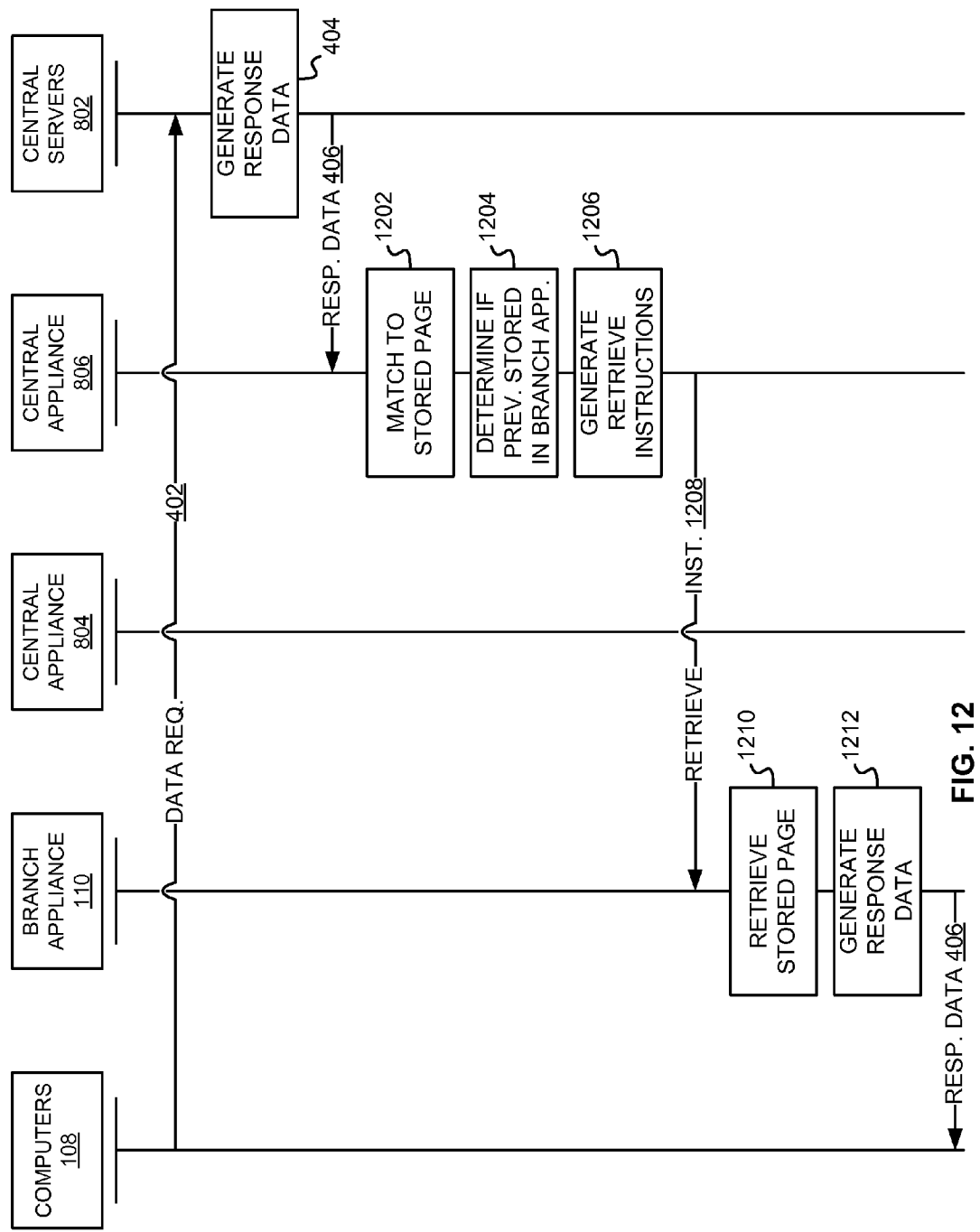
FIG. 12 is a message sequence chart for obtaining data at a branch computer when the data is locally accessible to the branch appliance, according to various embodiments.

FIG. 12 is a message sequence chart for obtaining data at a branch computer when the data is locally accessible to the branch appliance, according to various embodiments. In the example illustrated in FIG. 12, the computer 108 sends the data request 402 to the central servers 802. In sequence 404, the central servers 802 process the data request 402, and generate the response data 406 based on the data request 402. During transmission of the response data 406, the central appliance 806 transparently intercepts the response data 406, as opposed to the central appliance 804 as in the example illustrated in FIG. 11. In exemplary embodiments, a router or switch may determine which central appliance intercepts the response data 406. In sequence 1202, the central appliance 806 matches the response data 406 to a page stored locally. Next, in sequence 1204, the central appliance 806 determines whether the response data 406 has been stored in a long-term storage (e.g., the data storage 306) in the branch appliance 110.

In one example, the determination in sequence 1204 affirms that the data has been stored previously in the long-term storage in the branch appliance 110. The central appliance 806 is configured to generate retrieve instructions 1206 and to transmit retrieve instructions 1208 to allow the branch appliance 110 to build the response data 406 using data locally accessible to the branch appliance 110. In sequence 1210, the branch appliance 110 retrieves the stored page based on the retrieve instructions 1208. In sequence 1212, the branch appliance 110 generates the response data 406. Finally, the response data 406 is transmitted from the branch appliance 110 to the computer 108 that originated the data request 402.

Figure 13:
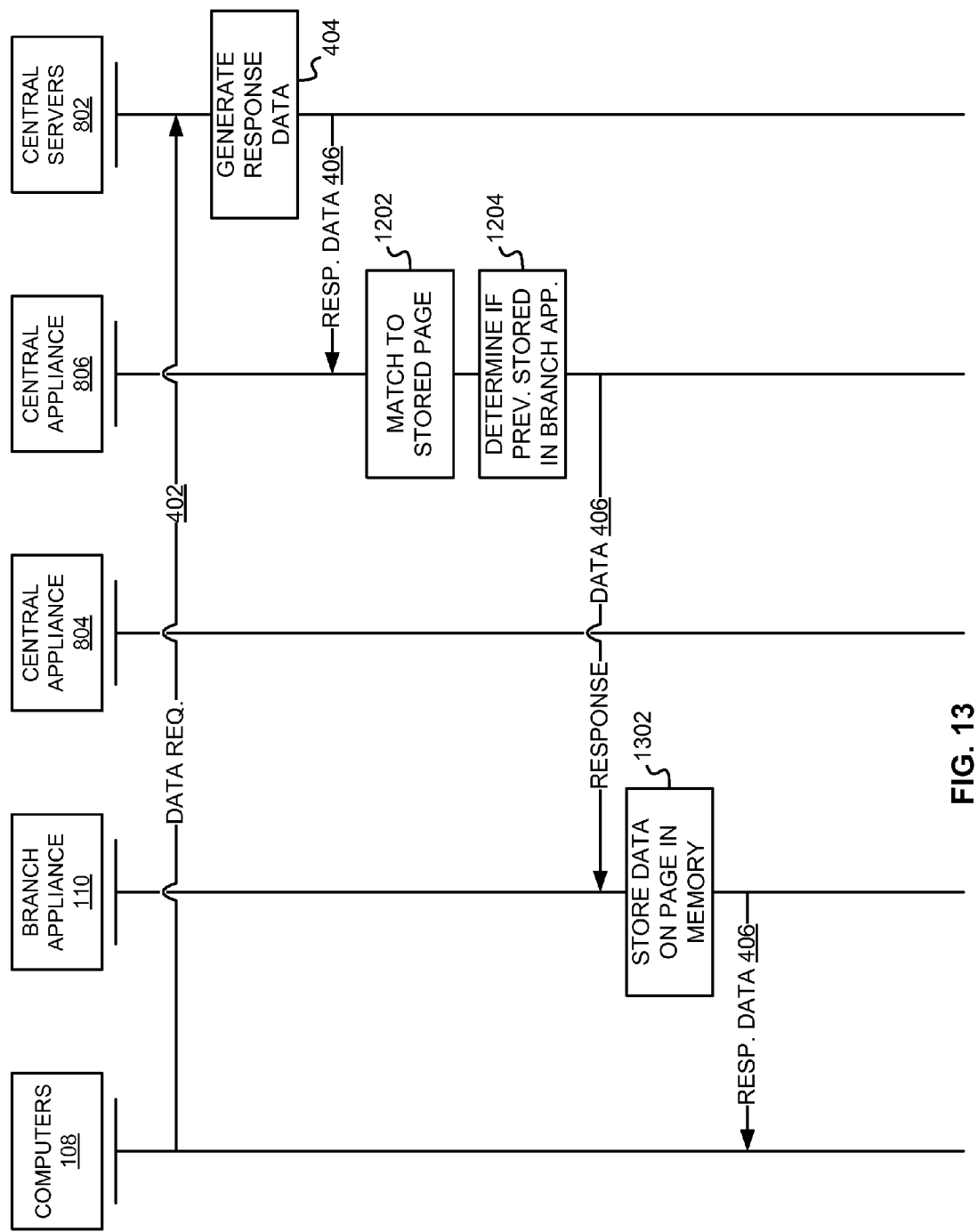
FIG. 13 is a message sequence chart for obtaining data at a branch computer when the data is not locally accessible to the branch appliance, according to various embodiments.

FIG. 13 is a message sequence chart for obtaining data at a branch computer when the data is not locally accessible to the branch appliance, according to various embodiments. In the example illustrated in FIG. 13, the computer 108 sends the data request 402 to the central servers 802. In sequence 404, the central servers 802 process the data request 402, and generate the response data 406 based on the data request 402. During transmission of the response data 406, the central appliance 806 transparently intercepts the response data 406, as opposed to the central appliance 804 as in the example illustrated in FIG. 11. In exemplary embodiments, as mentioned herein, a router or switch may determine which central appliance intercepts the response data 406. In sequence 1202, the central appliance 806 matches the response data 406 to a page stored locally. Subsequently, the central appliance 806 determines whether the response data 406 has been stored in a long-term storage (e.g., the data storage 306) in the branch appliance 110 in sequence 1204.

In one example, the determination in sequence 1204 is that the data has not been stored previously in the long-term storage in the branch appliance 110. The central appliance 806 is configured to transmit the response data 406 to the branch appliance 110. In sequence 1302, the branch appliance 110 stores the response data 406 on a page in memory. Finally, the response data 406 is transmitted from the branch appliance 110 to the computer 108 that originated the data request 402.

Figure 14:
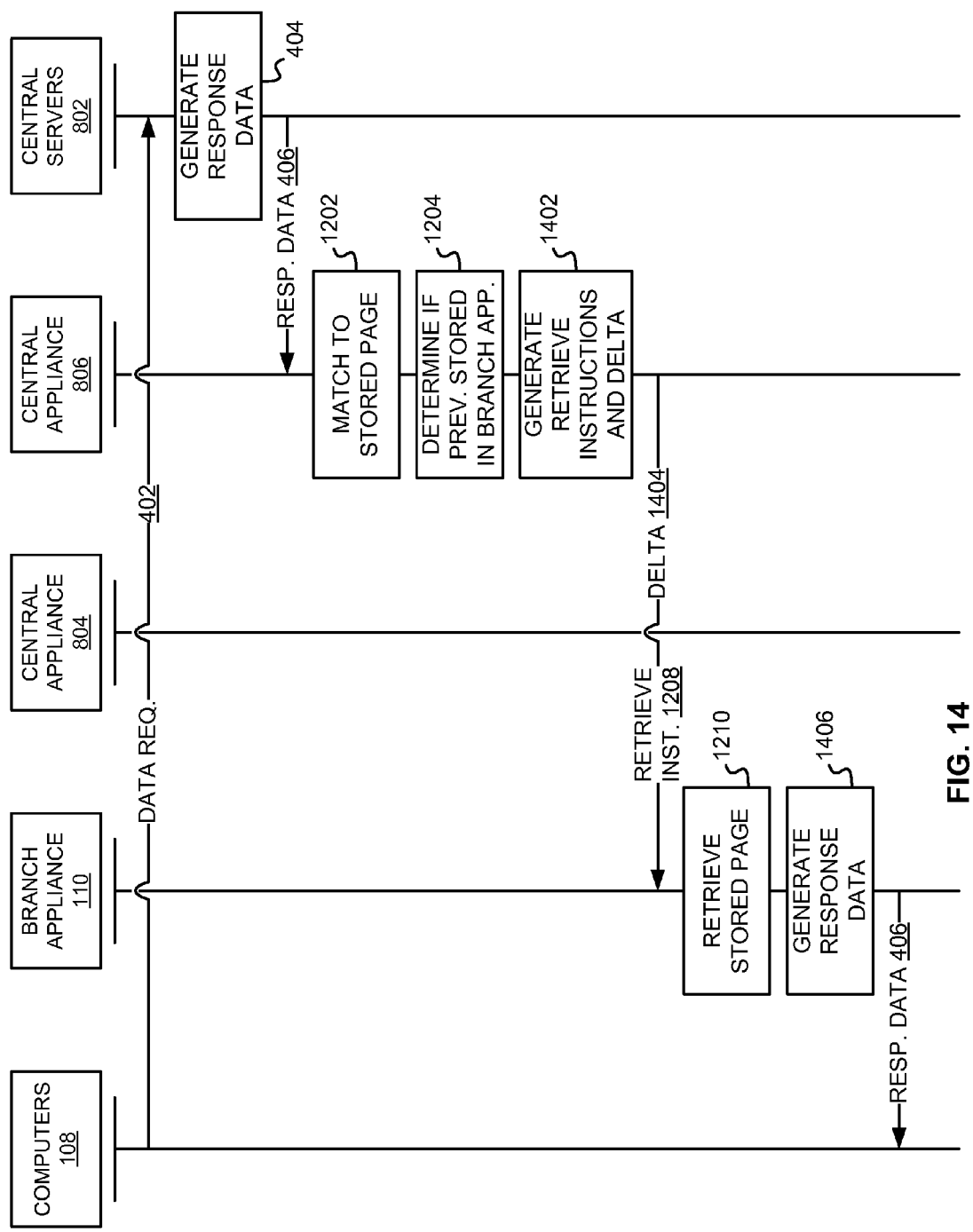
FIG. 14 is a message sequence chart for obtaining data at a branch computer when a portion of the data is locally accessible to the branch appliance, according to various embodiments.

FIG. 14 is a message sequence chart for obtaining data at a branch computer when a portion of the data is locally accessible to the branch appliance, according to various embodiments. In this example, the determination made in sequence 1204 may indicate that only a portion of the response data 406 has been stored in a long-term storage in the branch appliance 110. The portion of the response data 406 that has not been stored in the long-term storage in the branch appliance 110 may be referred to as a delta 1404. In sequence 1402, the central appliance 806 may transmit retrieve instructions 1208 and the delta 1404 to the branch appliance 110. In sequence 1210, the branch appliance 110 retrieves the stored page based on the retrieve instructions 1208. In sequence 1406, the branch appliance 110 generates the response data 406 using the retrieved page and the delta 1404. Finally, the response data 406 is transmitted from the branch appliance 110 to the computer 108 that originated the data request 402.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for reducing fragmentation of stored data, comprising:
    intercepting data addressed to a server or to a computer via a communication network at a central appliance in response to a request for the data;
    determining whether a portion of the intercepted data is locally accessible to a branch appliance;
    generating instructions to build a response data if a portion of the intercepted data is locally accessible to the branch appliance, the response data including a combination of the intercepted data and locally accessible data;
    storing the response data on at least one temporary page in memory at the central appliance, wherein a temporary page is a memory page for which a determination has not been made whether to store or discard the data; and
    transmitting from the central appliance to the branch appliance a deferred store instruction, wherein the deferred store instruction comprises:
        exchanging a message between the branch appliance and central appliance to determine whether to store the temporary page in memory, and
        storing the contents of the temporary page at both the central appliance and branch appliance.

2. The method of claim 1, wherein the deferred store instruction further comprises an address associated with the at least one temporary page at the central appliance having at least a portion of the response data.

3. The method of claim 1, wherein the deferred store instruction further comprises an instruction to the branch appliance to store the response data in a location in a database corresponding to a location in a database in the central appliance.

4. The method of claim 1, further comprising receiving an acknowledgement at the central appliance from the branch appliance that the contents of the at least one temporary page are stored in memory at both the central appliance and the branch appliance.

5. The method of claim 3, wherein the acknowledgement is an integrity check or hash.

6. The method of claim 1, wherein the storing the response data on at least one temporary page at the central appliance further comprises:
   determining whether a first temporary page is full; and
   storing the response data on a second temporary page if the first temporary page is full.

7. The method of claim 6, wherein the first temporary page is considered full if a predetermined period of time has elapsed since instructions were received.

8. The method of claim 1, further comprising assigning a location in a database to the at least one temporary page.

9. The method of claim 1, further comprising indexing the contents of the at least one temporary page.

10. The method of claim 9, wherein the indexing further comprises populating at least one signature hash table, the signature hash table being a fine signature hash table or a coarse signature hash table.

11. The method of claim 1, further comprising:
   rebuilding the response data at the branch appliance;
   storing the response data on a temporary page in memory based on the deferred store instruction;
   transmitting the response data to the server or computer.

12. The method of claim 1, wherein the exchanging a message between the branch appliance and central appliance to determine whether to store the temporary page in memory further comprises:
   determining that a first temporary page is full; and
   determining, based in part on an analysis of possible data fragmentation in storage, whether to store the contents of the temporary page in data storage.

13. The method of claim 1, wherein the determining whether a portion of the intercepted data is locally accessible to a branch appliance comprises determining whether a portion of the intercepted data has a similar pattern to data locally accessible to the branch appliance.

14. A system comprising:
   a branch appliance and a central appliances in communication with each other, the central appliance comprising:
   a processor that intercepts data addressed to a server or to a computer via a communication network at the central appliance in response to a request for the data, performs a determination of whether and where a portion of the intercepted data is locally accessible to the branch appliance, generates instructions to build a response data if a portion of the intercepted data is locally accessible to the branch appliance, the response data including a combination of the intercepted data and locally accessible data, stores the response data on at least one temporary page in memory at the central appliance, wherein a temporary page is a memory page for which a determination has not been made whether to store or discard the data, transmits to the branch appliance a deferred store instruction, the deferred store instruction exchanging a message with the branch appliance to determine whether to store the temporary page in memory, and storing the contents of the temporary page at both the central appliance and branch appliance, and
   a memory device configured to store the at least one temporary page at the central appliance and branch appliance.

15. The system of claim 14, wherein the processor instructs the branch appliance to store the response data in a location in a database corresponding to a location in a database in the central appliance.

16. The system of claim 14, wherein the processor determines whether a first temporary page is full, and stores the response data on a second temporary page if the first temporary page is full.

17. The system of claim 16, wherein the first temporary page is considered full if a predetermined period of time has elapsed since instructions were received.

18. A non-transitory computer readable storage medium having embodied thereon a program, the program being executable by a processor for performing a method, the method comprising:
   intercepting data addressed to a server or to a computer via a communication network at a central appliance in response to a request for the data;
   determining whether a portion of the intercepted data is locally accessible to a branch appliance;
   generating instructions to build a response data if a portion of the intercepted data is locally accessible to the branch appliance, the response data including a combination of the intercepted data and locally accessible data;
   storing the response data on at least one temporary page in memory at the central appliance, wherein a temporary page is a memory page for which a determination has not been made whether to store or discard the data; and
   transmitting from the central appliance to the branch appliance a deferred store instruction, wherein the deferred store instruction comprises:
   exchanging a message between the branch appliance and central appliance to determine whether to store the temporary page in memory, and
   storing the contents of the temporary page at both the central appliance and branch appliance.

* * * * *